United States Patent [19]
Hughes et al.

[11] Patent Number: 5,802,255
[45] Date of Patent: Sep. 1, 1998

[54] SYSTEM AND METHOD FOR CREATING EXPERT SYSTEMS

[75] Inventors: Peter M. Hughes, Kensington; Edward C. Luczak, Siver Springs, both of Md.

[73] Assignee: The United States of America as represented by the Administrator of the National Aeronautics and Space Administration, Washington, D.C.

[21] Appl. No.: 493,983

[22] Filed: Jun. 23, 1995

[51] Int. Cl.$^6$ .................................................. G06F 15/18
[52] U.S. Cl. .................................. 395/75; 395/50; 395/60
[58] Field of Search .................................. 395/50, 51, 800, 395/12, 60, 75, 76, 161

[56] References Cited

U.S. PATENT DOCUMENTS

| 5,133,045 | 7/1992 | Gaither et al. | 395/51 |
| 5,301,336 | 4/1994 | Kodosky et al. | 395/800 |
| 5,319,740 | 6/1994 | Yamada et al. | 395/75 |
| 5,333,237 | 7/1994 | Stefanopoulos et al. | 395/12 |
| 5,428,525 | 6/1995 | Cappelaere et al. | 364/140 |
| 5,542,024 | 7/1996 | Balint et al. | 395/161 |
| 5,546,507 | 8/1996 | Staub | 395/76 |

OTHER PUBLICATIONS

Peter M. Hughes, Edward C. Luczak, The Generic Spacecraft Analyst (GenSAA): A Tool for Automating Spacecraft Monitoring with Expert Systems, May 13, 1991.

*Primary Examiner*—Tariq R. Hafiz
*Attorney, Agent, or Firm*—Robert D. Marchant; Eileen A. Lehmann

[57] ABSTRACT

A system and method provides for the creation of a highly graphical expert system without the need for programming in code. An expert system is created by initially building a data interface, defining appropriate Mission, User-Defined, Inferred, and externally-generated GenSAA (EGG) data variables whose data values will be updated and input into the expert system. Next, rules of the expert system are created by building appropriate conditions of the rules which must be satisfied and then by building appropriate actions of rules which are to be executed upon corresponding conditions being satisfied. Finally, an appropriate user interface is built which can be highly graphical in nature and which can include appropriate message display and/or modification of display characteristics of a graphical display object, to visually alert a user of the expert system of varying data values, upon conditions of a created rule being satisfied. The data interface building, rule building, and user interface building are done in an efficient manner and can be created without the need for programming in code.

49 Claims, 31 Drawing Sheets

Data Manager Panel

Data Details

| | | | |
|---|---|---|---|
| Variable Name | DNS4-0 | GenSAA Type | Mission |
| Owner Process | TPOCC_DECOM | Server Host | |
| Data Type | CVT_ULI | Update Policy | Asynchronous |
| # of Elements | 4 | Update Rate | 10    1/10ths of secs. |
| Time Tag | None | CVT Component | Conv/Raw |
| | | Export to Server | ◆ Yes  ◇ No |

Description

Discrete State Specification

State Names    # of States  0

New State

State Name
Save
Low Value
Remove    High Value

[ OK ]    [ Apply ]    [ Close ]    [ Help ]

Fig. 12
Data Details Panel

Rule Editor Panel

Condition Builder Panel

Action Builder Panel

User Interface Builder Panel

Geometry Panel

Attributes Panel

Graphic Window Details Panel

Graphic Object Details Panel

Graphic Object Behavior Rules Panel

Example UIGO Palette

Example DDGO Palette

Example Image Palette

Example Palette DDGOs and UIGOs

A GenSAA Expert System in Operation

Example user interface of a GenSAA Expert System

Example user interface of a GenSAA Expert System

Example user interface of a GenSAA Expert System

Example user interface of a GenSAA Expert System

SYSTEM AND METHOD FOR CREATING EXPERT SYSTEMS

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. 2457), and may be manufactured and used by or for the Government for governmental purposes without the payment of any royalties thereon or therefor.

The present application is directed to a system and method for creating a highly graphical expert system without the need for programming in code.

BACKGROUND OF THE INVENTION

Spacecrafts have always required and still require a constant amount of monitoring on a real-time basis. In the past, flight operation teams (FOT) were utilized to monitor multiple screens of data, searching for Mission data values exceeding a predetermined tolerance for example. Systems for building types of monitoring expert systems were known, but they required a developer to write an exorbitant amount of program code to implement various functions of the expert systems. Programming was required for implementing a data input interface, a rule base, and various aspects of a user interface for example.

The spacecraft analysts who made up the aforementioned flight operation teams normally did not have the programming skills necessary to write any of the aforementioned necessary programming code. Extensive training would have been necessary for these spacecraft analysts to gain such programming skills, and the analysts did not have time to obtain such training. Accordingly, it was impossible for spacecraft analysts to develop their own expert systems for performing the various monitoring functions necessary for monitoring spacecrafts for example.

Since the spacecraft analysts were unable to develop such expert systems, trained programmers were needed to develop the expert systems based on knowledge communicated to them from the spacecraft analysts. This process of transferring spacecraft monitoring and fault isolation knowledge from spacecraft analysts from the programmers was difficult and time consuming. Further, writing the program code was time consuming based on the aforementioned difficulties. Accordingly, fully functional real-time monitoring expert systems could not be rapidly developed.

SUMMARY OF THE INVENTION

The present application was developed in an effort to solve the aforementioned problems. One object of the present application is to automate data monitoring tasks and assist such flight operation teams in detecting, isolating, and correcting faults quickly.

Another object of the present application is to develop a system and method in which an expert system is easily created and modified without the need for programming in code.

A still further object of the present application is to provide a system and method which can be performed by trained spacecraft analysts of an FOT to create their own expert systems.

Yet another object of the present application is to create a rule base system utilizing rules representing spacecraft and payload monitoring and fault isolation knowledge using rule based representations which are easily learned and easily used to describe reasoning processes used by spacecraft analysts.

A still further object of the present application is to create a system and method for creating a highly graphical interface which supports both textual and graphical presentations of health and status information and fault isolation conclusions.

A still further object of the present application is to create a system which is easily interfaced with TPOCC (Transportation Payload Operations Control Center) architecture to support analysts in control centers that use TPOCC for new missions.

An even further object of the present application is to provide a system and method for creating expert systems driven by real-time spacecraft telemetry and ground equipment status indicating current status of spacecrafts and their operation, and to enable spacecraft analysts to rapidly develop their own real-time graphical monitoring expert systems without the need for programming in code.

The objects of the present application are further fulfilled by providing a method of creating an expert system without the need for programming in code, comprising the steps of:

(a) selecting and defining variables for input of appropriate data necessary to drive the expert system to create a data interface;

(b) establishing conditions and actions to create rules of a rule base for the expert system, the defined variables of step (a) being usable to establish conditions which, when satisfied, produce corresponding established actions; and (c) associating defined variables with graphical display elements to create a graphical user interface, the graphical display elements being modifiable based upon varying input data values of the associated defined variables, to thereby create a highly graphical expert system without the need of programming in code.

The objects of the present invention are further fulfilled by providing a system for creating expert systems without the need for programming in code, comprising:

first means for creating a data interface by defining variables for input of appropriate data to drive an expert system;

second means for establishing conditions and actions to create rules of a rule base for the expert system, the defined variables being usable to establish conditions which, when satisfied, produce corresponding established actions; and third means for creating a graphical user interface by associating defined variables with graphical display elements, the graphical display elements being modifiable based upon varying input data values of the associated defined variables, to thereby create a highly graphical expert system without the need for programming in code.

More specifically, the aforementioned objects of the present application are achieved by the creation of a system known as Generic Spacecraft Analyst Assistant (GenSAA) which is a tool for enabling non-programmers (and specifically spacecraft analysts) to rapidly build simple real-time expert systems that perform spacecraft monitoring or fault isolation functions. Expert systems built using GenSAA will assist spacecraft analysts during real-time operations in spacecraft control centers.

GenSAA is a generic tool used to support development of expert systems and satellite control centers supporting spacecraft missions in Small Explorer (SMEX) and International Solar-Terrestrial Physics (ISTP) programs. The use of GenSAA significantly reduces development time and cost for new expert systems in this domain. GenSAA allows graphical displays and fault isolation knowledge to be reused from mission to mission. Expert missions developed with GenSAA have characteristics of being highly graphical, rule-based, easily created and modified, so that no program code needs to be written to develop these expert systems.

More specifically, expert systems are built using the GenSAA Workbench which provides a direct-manipulation style user-interface in which the expert system builder can utilize mouse based point-and-click and drag-and-drop operations to build these expert systems. Although developed and conceived to enable spacecraft analysts to rapidly build real-time graphical monitoring systems for use in TPOCC spacecraft control centers, GenSAA can further be used to rapidly build real-time graphical and control expert systems for non-TPOCC control centers. More specifically, GenSAA can be used to build real-time expert systems for a wide range of intelligent monitoring and control applications including industrial process control, network monitoring, and vehicle traffic monitoring and control.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 12 illustrates the Data Details display screen window;

DETAILED DESCRIPTION OF THE PREFERRED EMBODIMENTS

GenSAA is an advanced tool that allows for the rapid development of real-time graphical expert systems that perform intelligent monitoring and fault isolation functions. Rule based expert systems are created which receive spacecraft telemetry and ground system data for example, make inferences, and draw conclusions regarding data, while displaying both input data and conclusions using graphical display objects. GenSAA enables spacecraft analysts to construct their own graphical expert systems without the need for writing program code.

Figure 1:
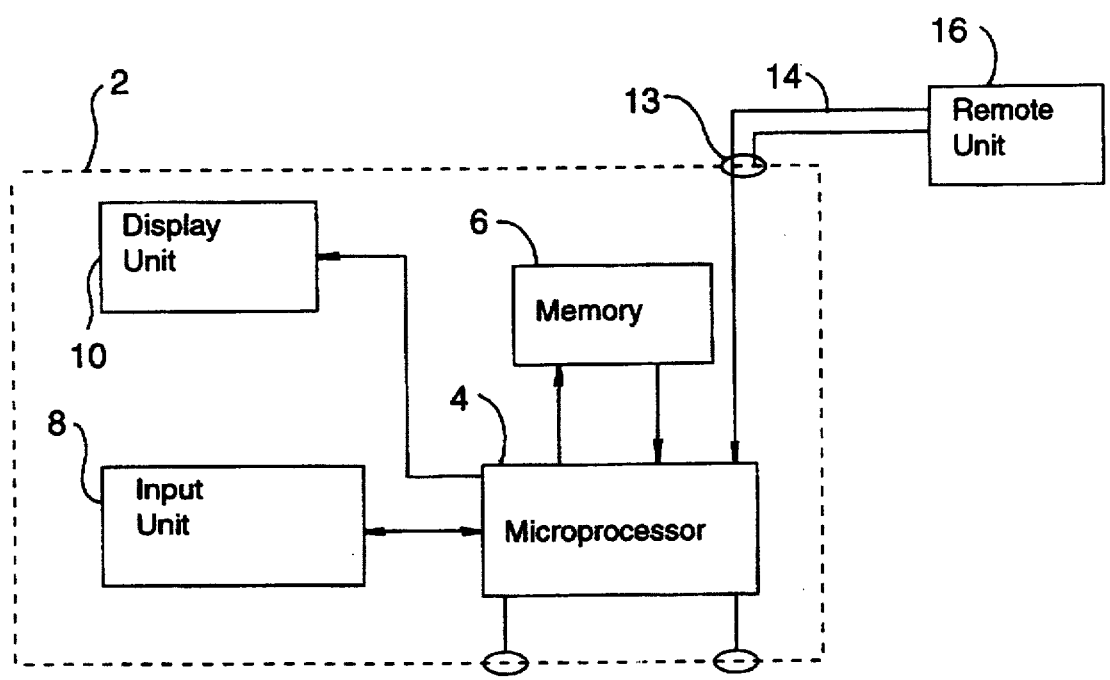
FIG. 1 illustrates a hardware implementation of the workstation used for creating expert systems including peripheral components and units.

FIG. 1 illustrates exemplary hardware for utilizing the tool of the present application for creating expert systems without the need for programming in code. Element 2 of FIG. 1 illustrates a workstation or personal computer which can be used to create an expert system. This workstation 2 is preferably a Unix workstation used in an off-line mode. However, this should not be considered limiting since other exemplary workstations include SUN SPARC stations and Hewlett-Packard HP 9000 series 700 workstations. More specifically, to support TPOCC System Variable Table (SVT) for the relevant spacecraft mission.

FIG. 1 also illustrates various components of the workstation including a microprocessor 4 connected to a memory 6, a display unit 10, and an input unit 8. Input/output ports 13 connect the workstation 2 through lines such as 14 to remote unit(s) 16 such as a unit including the aforementioned TPOCC System Variable Table (not shown). It should be noted that the lines 14 are shown for illustrative purposes only and can represent any remote connection to remote unit 16, such as a connection via an Ethernet local area network for example.

The microprocessor 4 can receive and subsequently store in memory 6, the GenSAA Workbench as will be described subsequently, which allows one to create an expert system. At the workstation 2, a data interface for selection of appropriate data to drive the expert system can be constructed, a rule base can be created, and a user friendly graphical interface can be created.

Information such as the GenSAA Run-time Framework used to execute GenSAA expert systems to support real-time operations in a TPOCC spacecraft control center for example, can be stored in the memory 6 or in a peripheral unit such as a remote unit 16, to run a created expert system on the aforementioned workstation 2. Other information such as the rule base generated, as well as the data interface and graphical user interface generated, can also be stored in memory 6. The memory 6 includes both random access memory (RAM) and read only memory (ROM) and can be internal to the workstation cabinet itself and/or can be a separate external memory unit.

The display unit 10, as will subsequently be explained, is used to display graphical display elements and data. The displayed graphical display elements can be constructed so as to change based upon data received and particular rules being fired in the rule base.

Finally, the input unit 8 can include both a keyboard and a mouse. The mouse unit, although not essential, provides the user with a direct manipulation style user interface in which the expert system can be built and revised using standard mouse based point-and-click and drag-and-drop operations.

Figure 2:
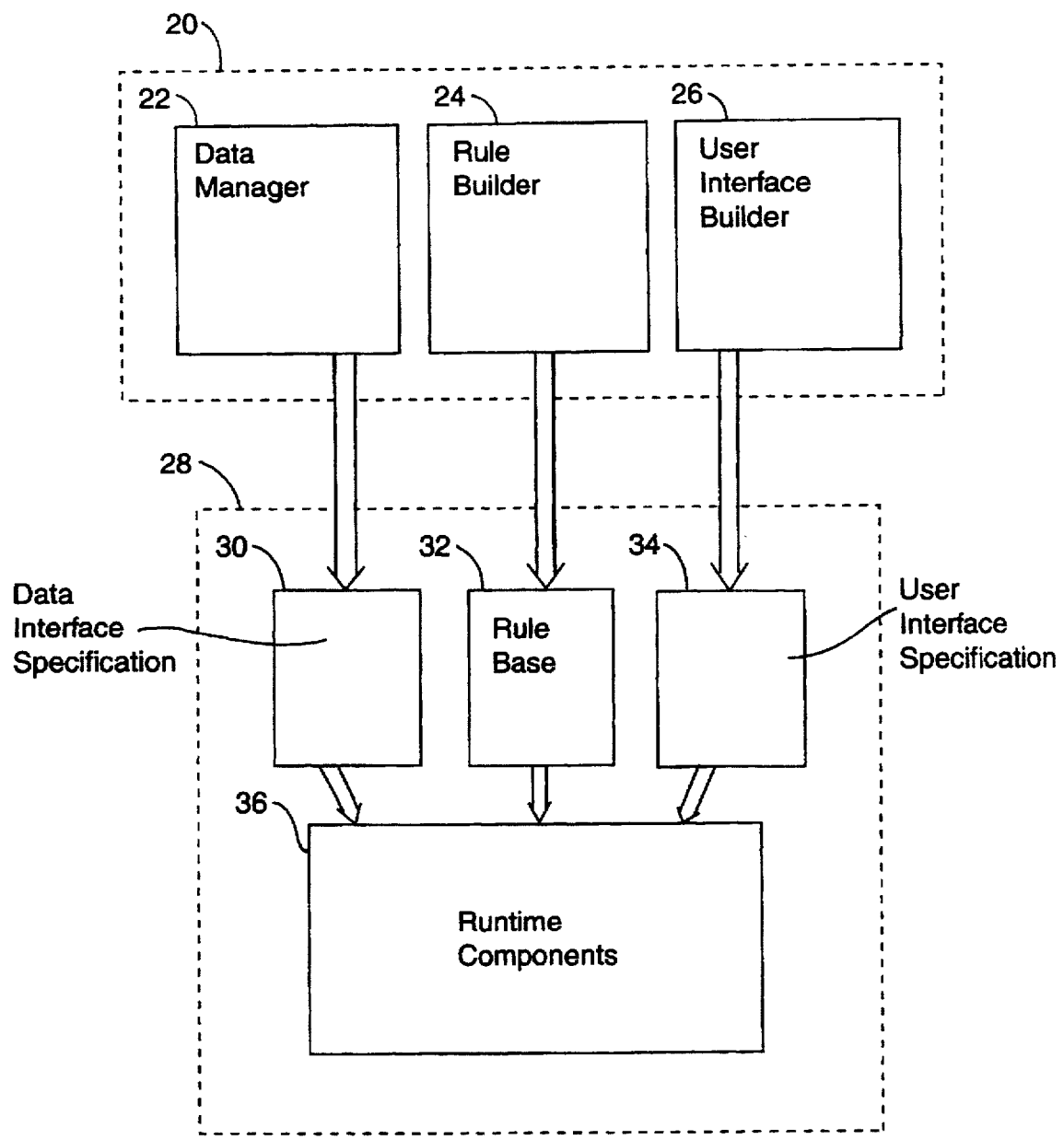
FIG. 2 illustrates basic building blocks of the workbench used for creating expert systems and the components expert system created.

FIG. 2 is an illustration of the elements of the workbench 20 which can be input and stored in memory 6 of a workstation 2 for example, and which can be used to create a set of files which can later be used by the run-time framework to define an executable expert system. The elements of the workbench 20 including the Data Manager 22, the Rule Builder 24, and the User Interface Builder 26 enable a user to create an expert system which performs real-time monitoring and fault isolation functions in an environment such as a TPOCC spacecraft control center, for example.

The workbench 20 creates several files; an exemplary list is shown below. The files are identified in the list by their file extension name, and by the type of information they contain.

| Filename | Contents |
| --- | --- |
| .mis | mission variables selected in the Data Manager 22 |
| .ud | User-Defined variables specified in the Data Manager 22 |
| .inf | inferred variables specified in the Data Manager 22 |
| .egg | externally-generated GenSAA variables specified in the Data Manager 22 |
| .clp | rule base 32 created by the Rule Builder 24 |
| .uif | user interface specification 34 created by the User Interface Builder 26 |
| .ges | resource names for the expert system specified by the work- |

-continued

| Filename | Contents |
| --- | --- |
| | bench 20 |
| .map | color map for the expert system displays |
| .rep | report file generated by the reports function |
| .ver | verification file generated by the verify function |

FIG. 2 further illustrates the components of a generated expert system 28 including a data interface specification 30 generated using the Data Manager 22; a rule base 32 generated using the Rule Builder 24; and a user interface specification 34 generated using the User Interface Builder 26. The generated data interface specification 30, rule base 32, and user interface specification 34 can be stored in memory 6 of a workstation 2.

While the run-time components 36 are used to run the expert system itself, they need not be stored in memory 6 of a workstation 2, but can be stored in memory of a remote unit 16. Since the run-time components 36 are used to run the actual expert system 28, it is illustrated in FIG. 2 as part of the generated expert system 28. It should further be noted that the same run-time components 36 can be used to run multiple expert systems 28 in a plurality of workstations 2 to monitor a plurality of sub-systems of a spacecraft, for example.

Figure 3:
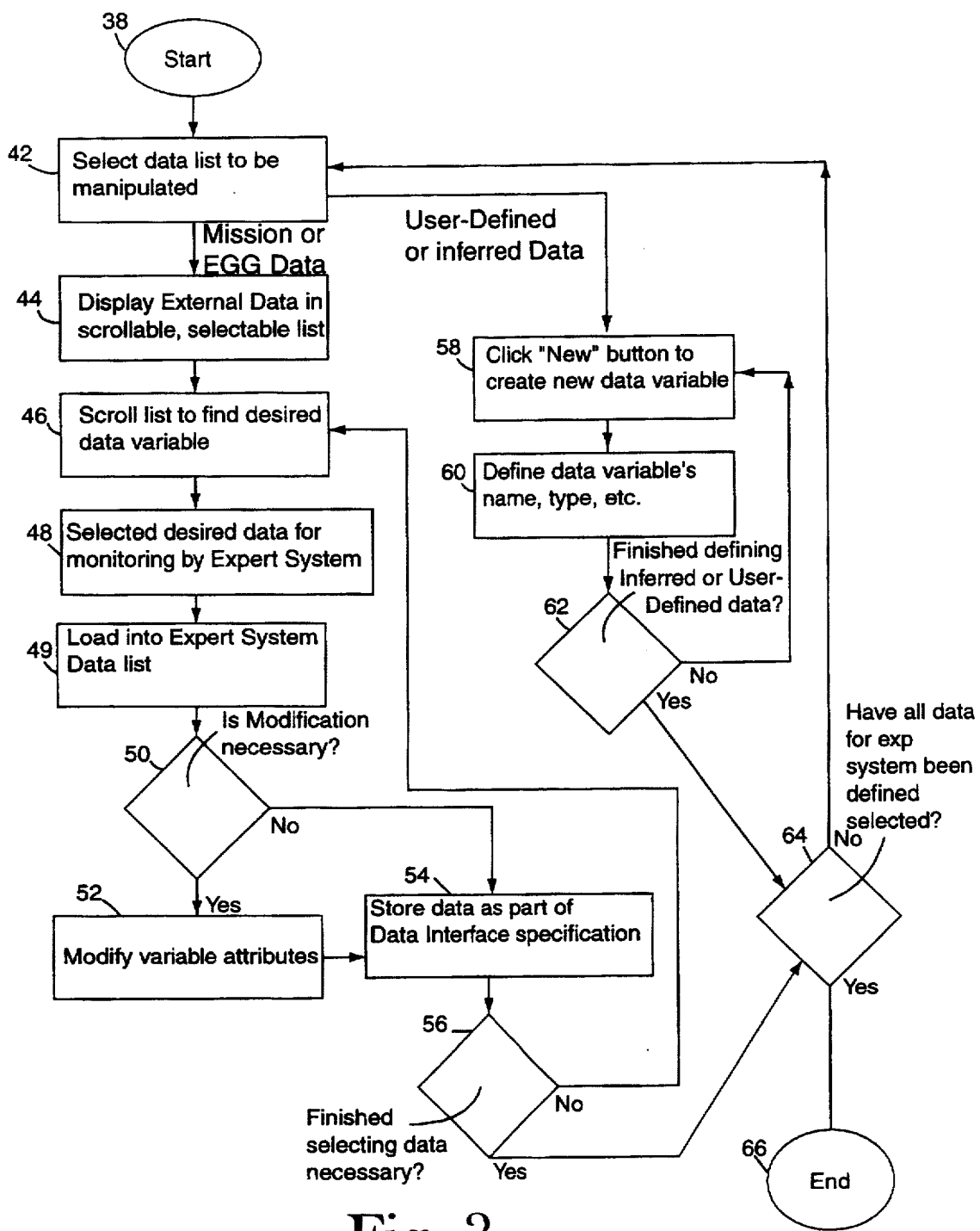
FIG. 3 illustrates the process performed by the Data Manager for creating a data interface specification of an expert system.

FIG. 3 is a flow chart illustrating operations performed by the Data Manager 22 as shown in FIG. 2.

The Data Manager 22 is used to construct a data interface by defining internal data variables and selecting external data to drive the expert system. The procedure for defining/specifying the new data for the data interface will be defined later in this section. As used herein, the term "Data" is a value for a "variable"; "rule conditions" are the tests of variable values (data) that must be met in order to satisfy a rule; and the "rule actions" are the things that will be performed if the conditions of the rule are met. The "rule actions" include setting the value of a variable (i.e., Inferred data in GenSAA), or sending a text message to the user of the expert system, for example.

Figure 11:
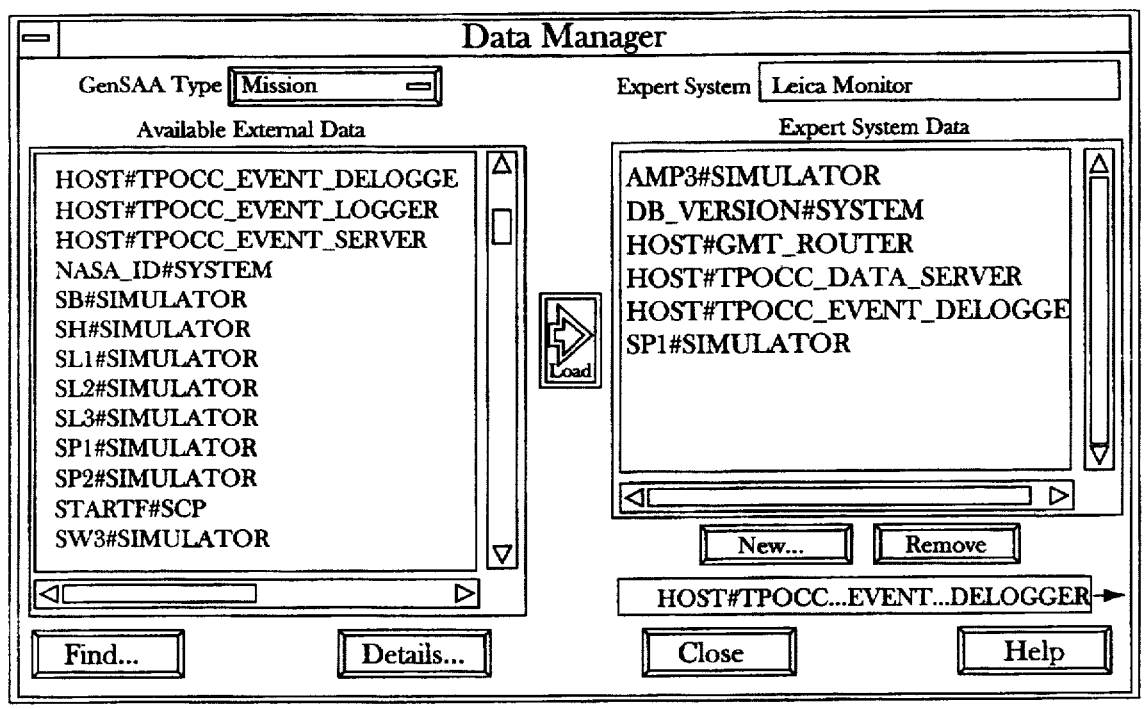
FIG. 11 illustrates the Data Manager display screen window.

As shown in FIG. 3, operation of the Data Manager 22 is started in step 38, and prestored variables are received and displayed. FIG. 11 illustrates how data variables are displayed.

The data interface specification constructible by the Data Manager 22 defines four types of data usable by a GenSAA expert system during real-time operations. The four data types include: Mission, User-Defined, Inferred, and Externally-Generated GenSAA (EGG) data. While these elements of data will be described using terminology unique to spacecraft monitoring, it should be recognized that similar and different types of data and its associated variables can be defined and redefined for any other operation utilizing expert systems for other purposes.

Mission data variables represent real-time status of monitored spacecrafts and related ground support systems and are sometimes referred to telemetry mnemonics. These variables can be received in step 40 from a remotely located TPOCC system and more specifically from a TPOCC System Variable Table stored in memory of the TPOCC system, for example. The TPOCC data server is one example of a remote unit 16 which provides data variables selected during execution of the expert system. The TPOCC System Variable Table provides the workstation unit 2 with the prestored table of select mission variables needed to request data used in an expert system for monitoring spacecraft and related ground support systems.

During run-time of the created expert system, only data values of selected variables will be received by the expert system. Accordingly, in creating the data interface specification, the user selects certain variables applicable to his expert system to be generated. Data values of the variables will be received and updated during the spacecraft contact period. If graphical objects are defined in the user interface and connected to the specific data variables, then their values will be displayed. More details on this will be provided later in the User Interface Builder section. Data values are received from the TPOCC data server which is part of the TPOCC software, for example.

To illustrate how the Mission data variables are created using the Data Manager 22 (FIG. 11), the following example is provided referring to FIG. 3. Initially, a data list to be manipulated is selected in step 42. From there, if User-Defined or Inferred data variables are to be created, the next step is step 58 (as will be explained later). However, for Mission or EGG data variables, the Available External Data list is displayed in step 44. This list is then scrolled to find a desired variable in step 46. Then, in step 48, the selected variable, for receiving data values desired to be monitored by the Expert System, is clicked on to make the selection. Next, the "Load" (right arrow in FIG. 11) button is clicked in step 49 to add the selected variable to the Expert System Data list. The loaded variable name appears in the Expert System Data list box of FIG. 11. The list is always sorted alphabetically by variable name.

To determine if the details of this variable need modification, in step 50 the "Details" button is clicked on to display the Data Details panel (FIG. 12) for this data variable. The appropriate modifications are then made in step 52, and after modifications are made, the "OK" or "apply" button is clicked on to save the changes. The data, including modifications made in step 52, are stored in memory 6 as part of the Data Interface specification in step 54.

Next, in step 56 it is determined whether or not data variable selecting is finished. If so, in step 64 it is determined whether or not all variables necessary (whose data values are to be received) have been defined and selected. If so, the End is reached in step 66. If not, step 42 is repeated.

As previously stated, a variable can be modified in step 52 is modification is determined to be necessary in step 50. Modifications of a variable can take place by selecting various options from predetermined pulldown menus or windows for example. Simple windows driven and mouse selection operations are ideally suited for such an application to further the simplicity of creating an expert system. For example, to modify the details for a variable in the Data Manager 22, the variable name in the Expert System Data list of the Data Manager (FIG. 11) can be clicked on. Then, the "Details . . . " button is clicked on. The Data Details panel (FIG. 12) will then appear. The value of any of the details value fields can then be clicked on, and the desired value can be entered using a keyboard of input unit 8, for example. Thus, a variable can be selected in step 48, loaded in step 49, modified in step 52 if necessary, and stored in memory 6 as part of the Data Interface specification in step 54 merely by clicking a control button of a mouse in an input unit 8 over an appropriate selection.

Other additional variables can be defined including externally generated GenSAA data variables (EGG data variables). These consist of Inferred or User-Defined data variables which are made available by other GenSAA expert systems. As will be explained later, inferred or User-Defined data variables (which will also be discussed subsequently) can be coded or identified as being "public" which causes the data to be re-routed to a GenSAA data server (also to be described subsequently) which distributes them to any process or other GenSAA expert system requesting them. These requests are done based upon a type of "subscription", wherein only data of variables "subscribed to" which have previously been made "public" will be sent to a particular expert system. For example, a GenSAA expert system may require information about the status of a subsystem which is being monitored by another GenSAA expert system. Such inter-expert system communication is conducted through EGG data. EGG data are selected in the same manner as Mission data and as defined in steps 44–56 of FIG. 3.

Additional variables can also be defined as shown in FIG. 3. These additional variables can include Inferred and User-Defined data variables. The Inferred data variables represent conclusions inferred by rules in the rule base. For example, an Inferred data variable might represent the health or fault status of a component in a spacecraft subsystem.

The value of an Inferred data variable is set by an expert system rule when all of the conditions in the rule are satisfied. For example, an inferred data variable "BatteryStatus" can be set by a rule that might have the conditions "BatteryVoltage<32.78", "SolarArrayStatus=OK" and "BatteryTemp<115". When all of these conditions are true, then a rule action can set the value of BatteryStatus to "WarningHigh" for example. This Inferred data variable could also be connected to a graphical object on the end-users screen to visually inform the end-users of this value. As will be explained later with regard to the rule base, values are assigned to Inferred data variables based upon actions executed in a "then" part of a rule upon firing of a rule (the "then" refers to rules in the rule base being in a standard "if-then" format wherein, upon all conditions of a rule being satisfied, then the actions of the rule are executed resulting in the firing of the rule and the production of Inferred data variables).

User-Defined data variables (another type of defined additional variable) may represent expected operating modes and equipment configurations. For example, a User-Defined data variable might represent the setting of a switch that determines which of two redundant components which might be used. During runtime of the expert system, the data values for these User-Defined variables can be entered by a spacecraft analyst through a keyboard of input unit 8, for example, during the spacecraft operations.

To illustrate how User-Defined and/or Inferred data variables are created using the Data Manager 22 (FIG. 11), the following example is provided and refers to the steps in FIG. 3. First, in step 42, User-Defined or Inferred is selected from the GenSAA Type option menu. The names of the variables already created appear in the Expert System Data list. (The Available External Data list is not used, and remains empty.) The "New . . . " button of the Data Manager Panel is clicked in step 58 button to create a new User-Defined or Inferred variable. This causes the "Data Details" panel (FIG. 12) to appear. Then, in step 60, the following items on the Data Details panel are set: Variable Name, Data Type, etc. Default values may be suggested for some or all of the items. The "OK" button can be clicked to add the new User-Defined or Inferred variable to the data list. If so, then the Data Details panel is dismissed, and the new variable appears in the Expert System Data list box of the Data Manager Panel of FIG. 11. Further, the "Apply" button can be clicked instead of OK to add the variable to the list. If this occurs, then the Data Details panel is kept open and steps 58–60 can be repeated to add more Inferred or User-Defined data variables (i.e. it is determined in step 62 that more Inferred or User-Defined variables must be defined). If all of the Inferred or User-Defined data variables are defined, the "Close" button is clicked to dismiss the panel in step 62 and in step 64 it is again determined whether or not all necessary variables for the expert system have been defined and selected.

Finally, it is determined in step 64 whether or not all variables necessary to drive the expert system have been selected or defined. If not, then step 42 is repeated to continue defining of desired Mission or EGG data variables (steps 44–56) or to continue defining of additional User-Defined or Inferred data variables (steps 58–62). Once all variables necessary to drive the expert system have been stored, then this first step of the process for creating an expert system is ended in step 66.

The user is a domain expert and should be cognizant of all of the necessary data required to perform the reasoning process which is being automated with the use of expert system rules. This application is intended to be used by domain experts and not programmers. Therefore, it is assumed that the user is qualified to know what data is necessary to be monitored and what data variables are needed for additional processing (i.e. what data variables need to be included in the expert system being created) or as an intermediate storage for display to the end user of the expert system, during runtime.

Figure 4:
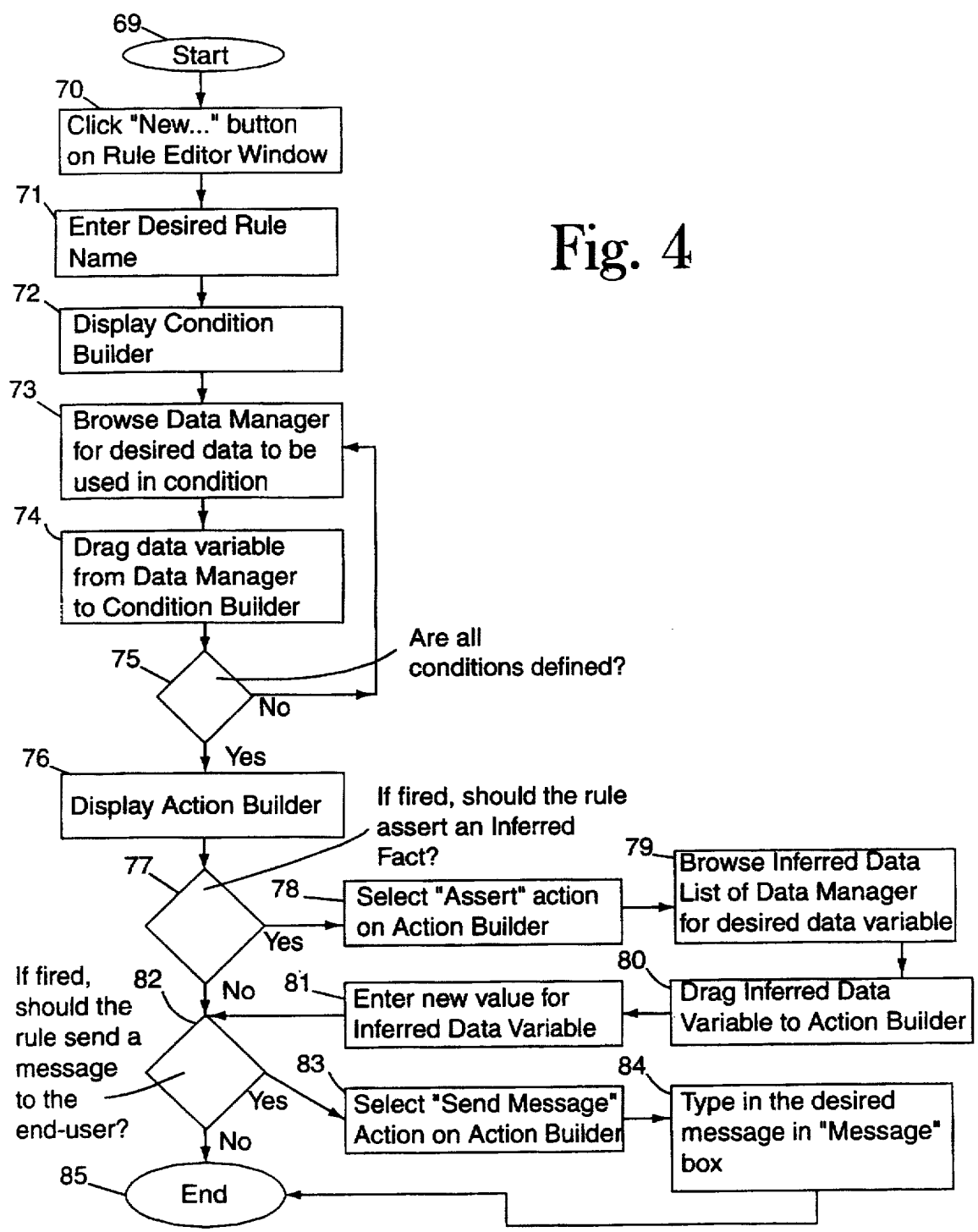
FIG. 4 illustrates the operation of the Rule Builder for developing a rule base of the expert system.
Figure 13:
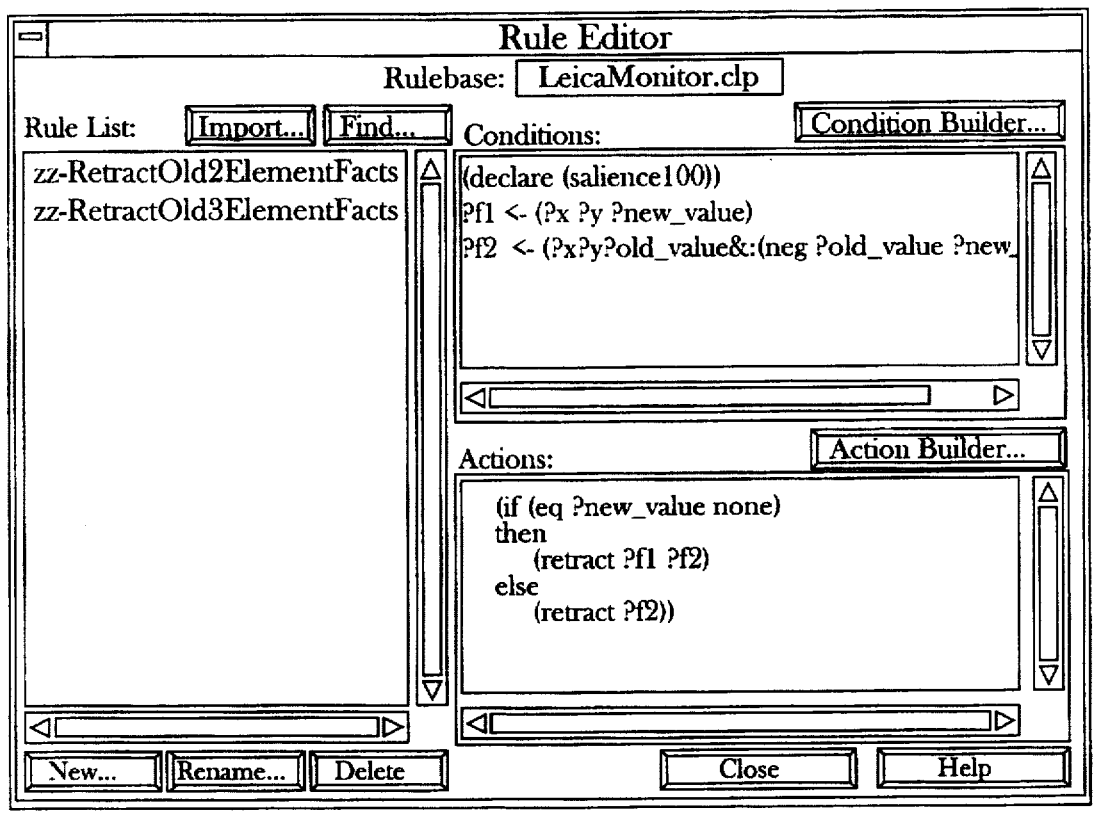
FIG. 13 illustrates the Rule Editor display screen window.

FIG. 4 is a description of the steps executed during the rule building stage using the Rule Builder shown in FIG. 13. The Rule Builder 24 is utilized to create a rule base for a GenSAA expert system. A rule base is a set of expert system rules in condition-action (if-then) format that may infer new facts based on currently asserted facts (data). An inference engine, as will be explained later in detail, manages the matching and firing of the rules in the rule base during the execution of a GenSAA expert system.

To simplify the process of building rules for the rule base, condition/action building templates (FIGS. 14/15 respectively) are provided to make it easy to build rules quickly using standard drag-and-drop techniques achieved via the mouse of the input unit 8 for example. Further, as previously stated, values of the data interface specification can be used to establish conditions which, when satisfied, generate inferred data variables. As shown in FIG. 4, rule building is started in step 69 and in steps 70 and 71, allows the Workbench user to define the name of the rule. This is done by first clicking the "New" button on the Rule Editor Window or Panel in step 70 (FIG. 13) and then entering the desired rule name in step 71.

To define the conditions of a rule, a Condition Builder (FIG. 14) of the Rule Builder 24 is provided. The Condition Builder is displayed in step 72. It is used in conjunction with the Data Manager (FIG. 11) to allow the WorkBench user to browse the list of Mission, User-Defined, Inferred, and Egg data variables in step 73 for inclusion as a rule condition. Data variables that are desired to be a test element of a condition can then be dragged from the Data Manager panel to the Name box in the Condition Builder panel in step 74. Additional details regarding the value of the data variable can be defined using menus or keyins. These steps can be repeated until all of the conditions of the rule are defined in step 75.

Figure 14:
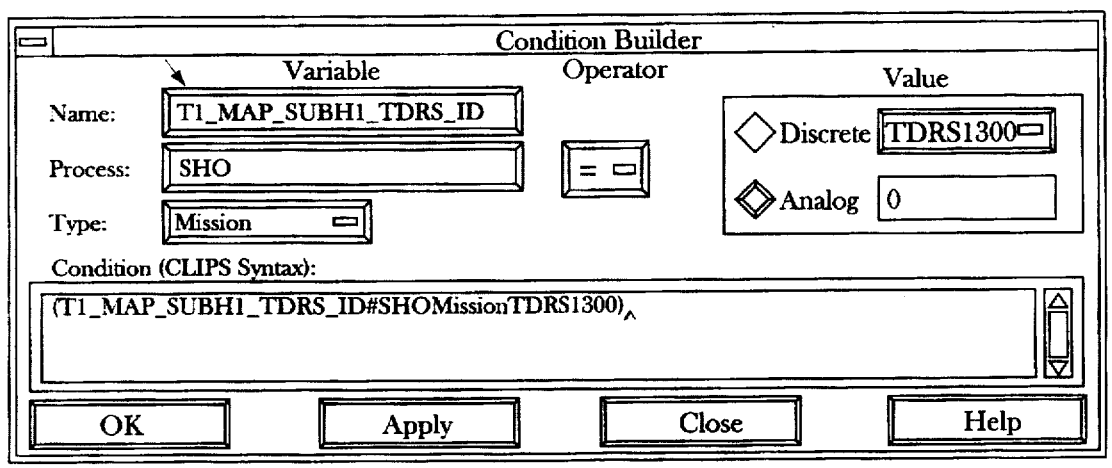
FIG. 14 illustrates the Condition Builder display screen window.

More specifically, after browsing the Data Manager for desired data to be used in a condition of a rule in step 73, it is determined whether or not a data variable is usable for establishing a condition. If so, then the variable is selected in step 74 by merely dragging, i.e. clicking on the variable with the mouse of the input unit 8 and holding the mouse button down and repositioning the mouse to move the onscreen pointer from the displayed Data Manager (FIG. 11) to the Condition Builder panel (FIG. 14), the variable name from the displayed Data Manager (FIG. 11) to the Condition builder panel (FIG. 14). The remaining elements of the condition can be created by selecting the desired operator (<, >, =, etc.) and entering the value desired to properly define the condition. As these operations are performed, the rule syntax is automatically generated and displayed in the "condition (CLIPS syntax)" viewing area. If the condition is satisfactory, then the "Ok" or "Apply" button is clicked to transfer the rule syntax to the "Conditions" test area of the rule Editor (FIG. 13). In step 75, it is checked to see if all conditions have been defined. If so, when the "OK" or "Apply" button is clicked, the Condition builder is dismissed.

In a similar manner, the Actions of the rule can be defined. A difference, however, is that there are different types of actions that can be performed: (1) an inferred data value can be asserted, 2) an inferred data value can be retracted, and 3) a text message can be displayed to the user of the expert system. The Action Builder supports the development of all of these actions and the automatic generation of the of the programming code (syntax) to perform these actions.

Figure 15:
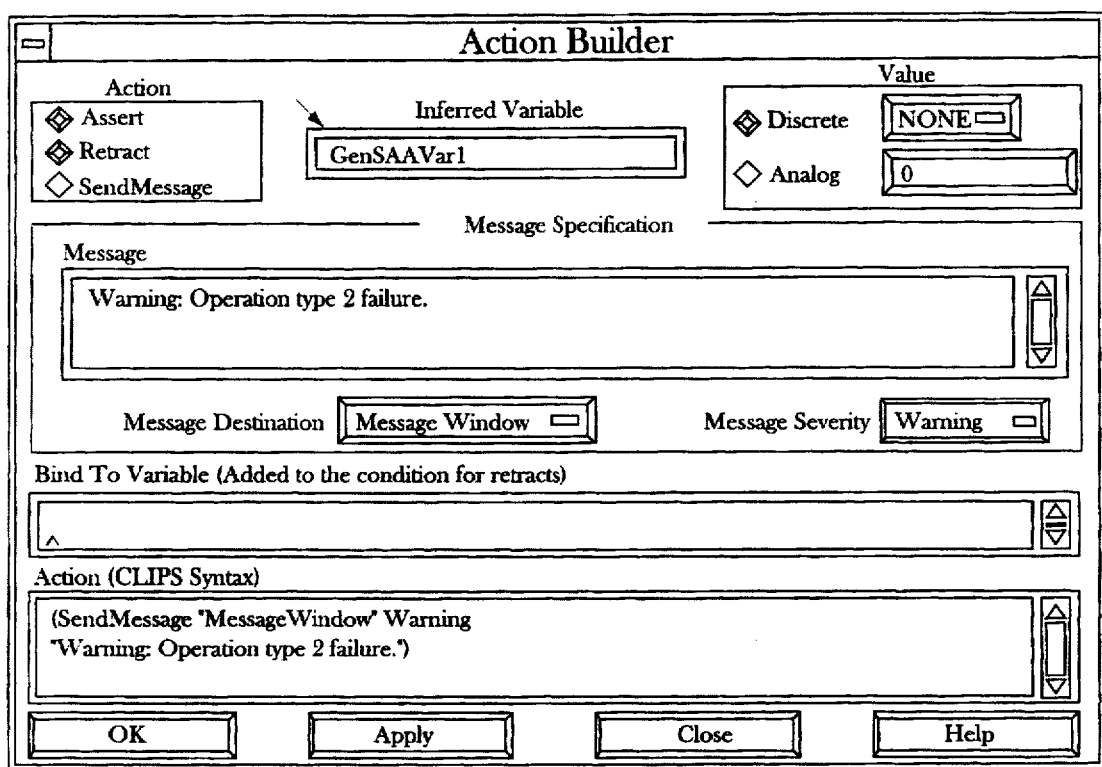
FIG. 15 illustrates the Action Builder display screen window.
Figure 16:
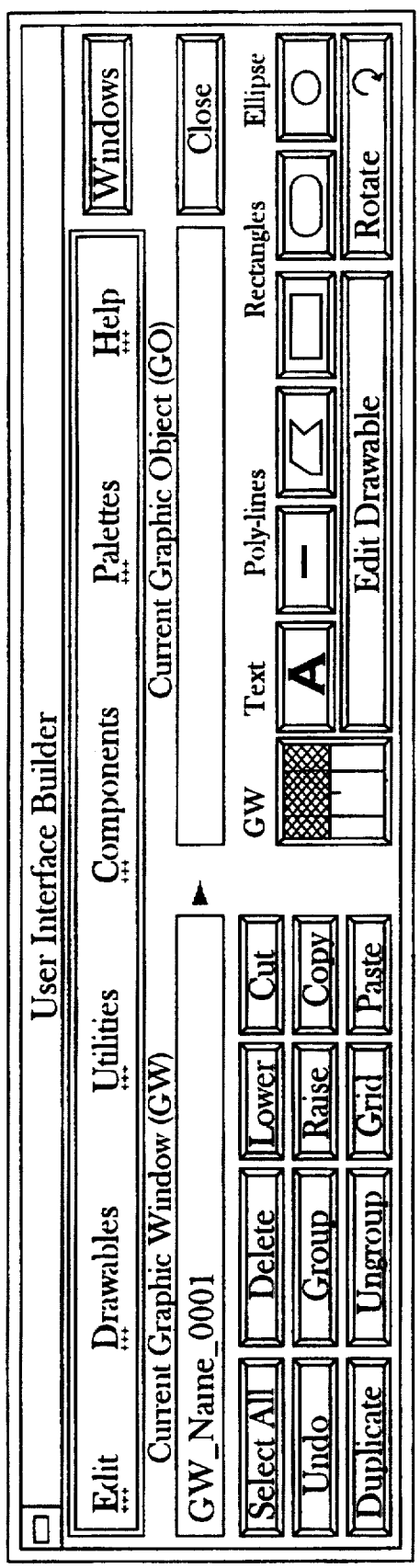
FIG. 16 illustrates the User Interface Builder display screen window.

An Action Builder (as shown in FIG. 15) is provided and displayed in step 76 to facilitate the construction of actions to be performed during Expert System execution of a rule when all of the conditions are satisfied. Actions include asserting/retracting an inferred fact; performing a mathematical calculation; and displaying text messages or modifying a displayed graphical element via a user interface on display unit 10, for example.

More specifically, in step 76, the Action Builder panel (FIG. 15) is displayed. Then, in step 77, it is determined whether or not, if the rule is fired, it should assert an inferred fact. If so, in step 78 the "Assert" action on the Action builder is selected. Next, the "Inferred Data" list of the Data Manager can be browsed in step 79 for desired variables. Then, in step 80, the desired inferred data variable can be dragged to the Action Builder panel (FIG. 15). Thereafter, the new value for the inferred data variable can be entered and stored in step 81.

Next, in step 82 following the completion of step 81 or following a "No" response to the question posed in step 77, it is determined whether or not, if the rule is fired, it should send a message to the end-user. If not, the end is reached in step 85. If so, the "send message" action on the Action builder is selected in step 83 and the desired message is input in the message box in step 84.

To illustrate how a rule is constructed, the following example is provided. Given an over-simplified situation that a satellite battery problem is indicated by the following three conditions: 1) a low battery voltage, 2) a low battery amperage, and 3) a normal solar array output voltage, a rule can be constructed to detect this situation during expert system operation using the Rule Builder 24 and its supporting tools, the Condition Builder and the Action Builder. For the purpose of this example, it is assumed, for simplicity purposes, that only a message is to be sent to the user alerting him/her of the situation.

To begin the construction of a new rule, the Data Manager 22 and Rule Builder 24 are initially displayed by clicking on the "Data Manager" and "Rule Builder" buttons of the GenSAA Control Panel. On the Rule Builder panel (FIG. 13), the "New . . ." button is then clicked and the rule name "BatteryLowProblem" is then entered on the panel that is displayed. To construct conditions, "Mission" is initially chosen as the GenSAA Type on the Data Manager panel (FIG. 11) and the data variable "BatteryVoltage" in the Expert System data list is then browsed for. Once found, "BatteryVoltage" is clicked on, thereby causing it to appear in the drag-out box below the "New . . ." and "Remove" buttons. Then the variable name is dragged from the drag-out box into the "Name" field of the Condition Builder panel causing the variable name to appear in the Name field. Next, the "<" operator is selected from the Operator option menu and "23.5" (arbitrary number for purpose of this example only) is typed into the "Analog" field of the Condition Builder panel to complete the definition of the condition that corresponds to the low battery voltage. This sequence of action for building conditions is then repeated for the other two conditions necessary to complete the definition of the conditions of this rule.

To build the simple action of sending a message to the user, the Action Builder (FIG. 15) panel is displayed by clicking on the button of the same name on the Rule Builder (FIG. 13) panel. Then, "Send Message" on the Action Builder is selected and the desired text message is typed to alert the end-user of the expert system of the current situation. For example, the message would be: "Spacecraft Battery is at a critically low level; turn all instruments off." Alternatively, an Inferred Data variable could have been set to a new value or the current value could have been retracted.

Similar to that previously described in steps 77–81 and 82–84, inferred data values to be retracted, or display modifications of displayed variables which are to be output upon execution of a rule can be established. The inferred data value assertions or retractions, messages, and display modifications are actions of a rule and when a rule of a rule base is fired based upon all of its conditions being satisfied, the actions, including output or display of inferred data values, messages or display variable modifications are then performed. Accordingly, the actions may include displaying a message or modifying an existing displayed variable, and can further include establishing a new inferred data value which might subsequently be utilized by another expert system monitoring an additional subcomponent of the overall system.

Finally, the Workbench user determines whether or not enough rules exist in the rule base to identify all problems, states, etc. If so, the rule building ends in step 85, and if not, the process of FIG. 4, is repeated so that the rule building process can continue.

Figure 5A:
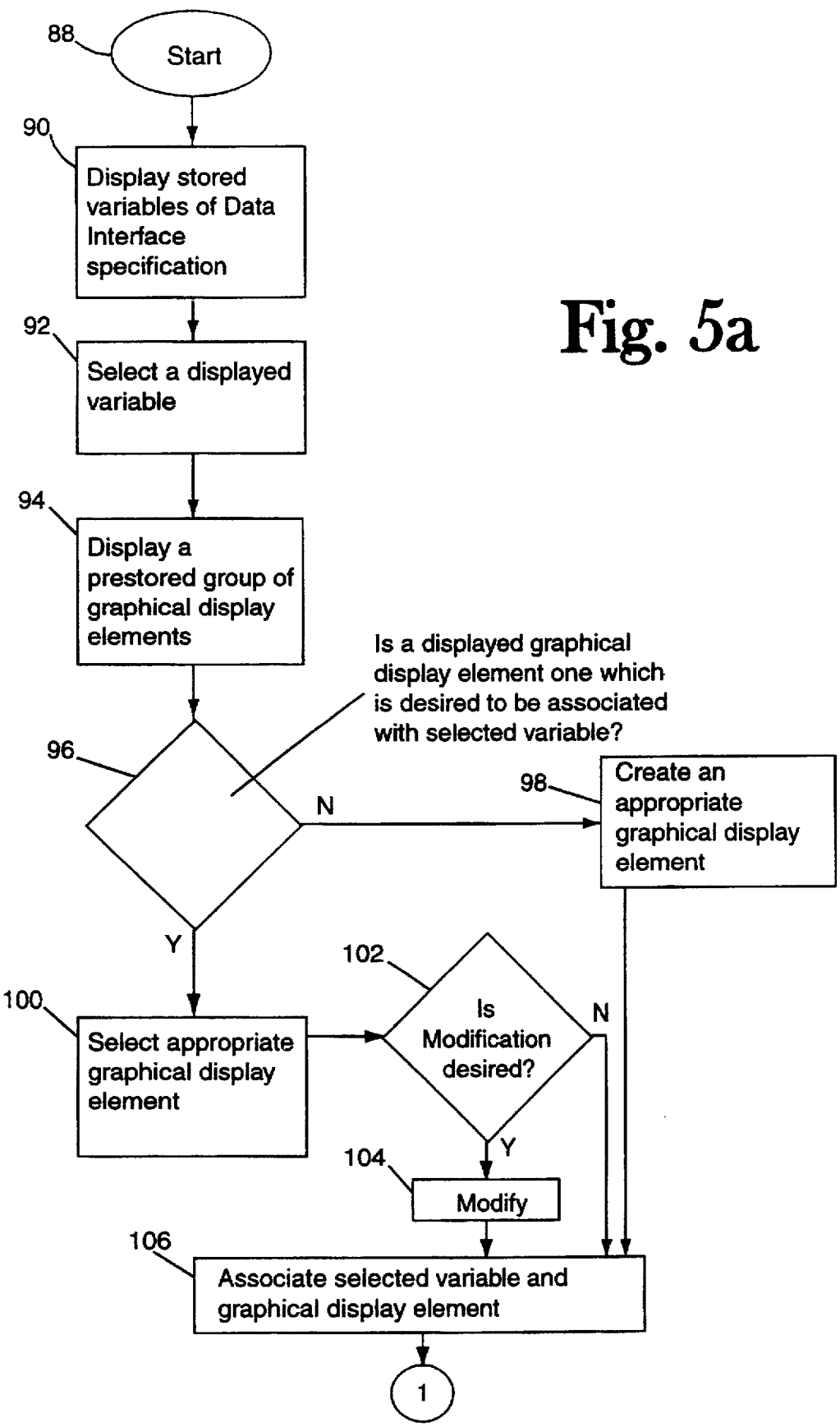
FIGS. 5A and 5B illustrate the operation of the User Interface Builder for developing a user interface specification for the expert system.

FIGS. 5A and B illustrate the process for utilization of the third utility of the GenSAA Workbench, namely the User Interface Builder 26. The User Interface Builder 26 is a powerful tool for creating graphical user interfaces for expert systems. The graphical elements for display can be dynamically created and customized without the need for programming in code for mechanisms in this particular utility.

The User Interface Builder 26 is used to create the user interface specification 34 for GenSAA expert system. The user interface specification 34 defines user interface windows, layout, and behavior of graphical objects or graphical display elements that comprise an operational user interface of the expert system. The User Interface Builder can use a variety of Motif, TPOCC, and other x-tool kit widgets including push button, option menus, scrolling text lists, user-created graphical-icons, and data driven objects such as meters, gauges, and miniature strip charts.

As shown in FIG. 5A, building of the user interface specification 34 begins in step 88. In step 90, the variables of the data interface specification 30 are again displayed. In step 92, a displayed variable is selected via mouse of input unit 8, for example.

Figure 22:
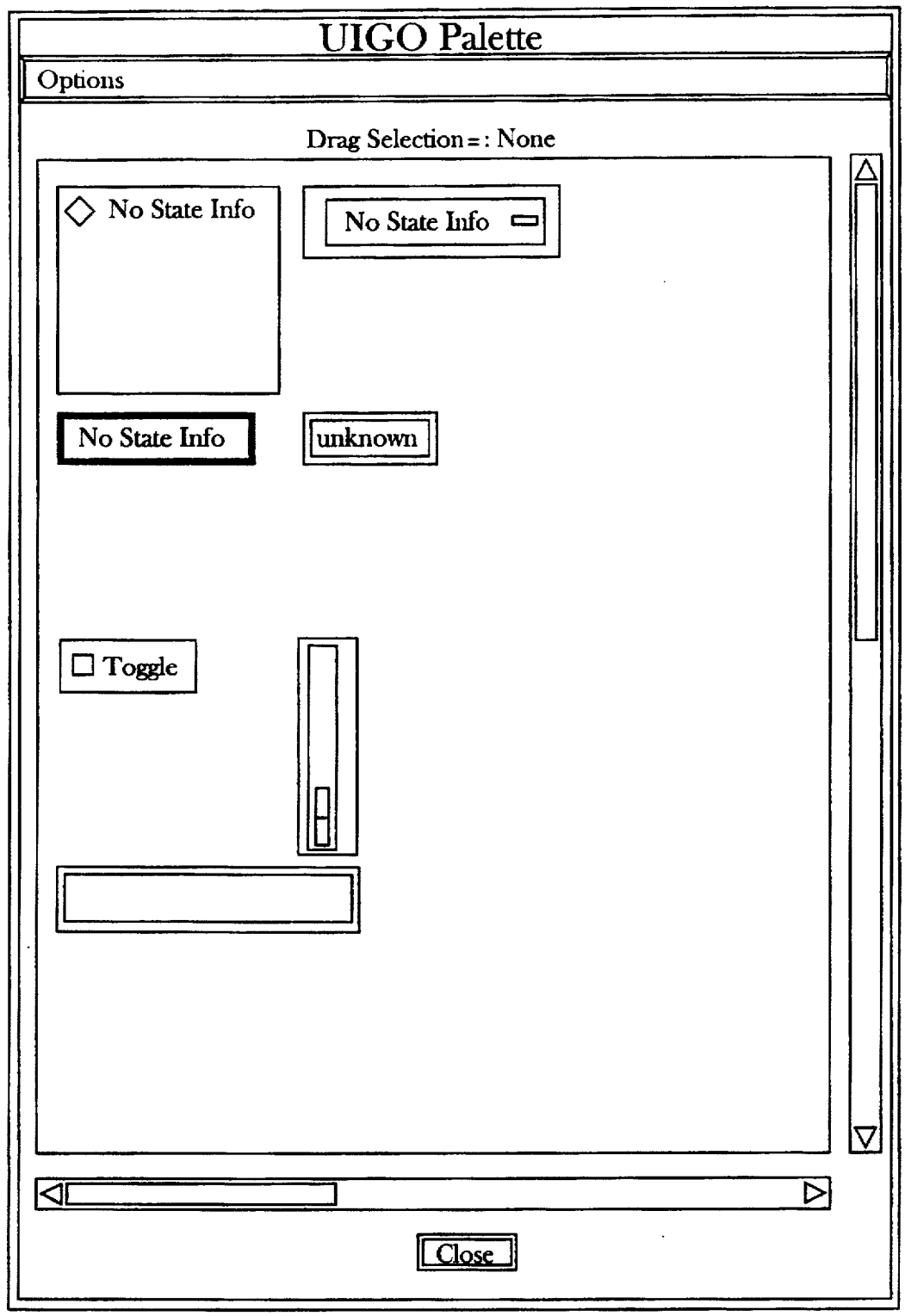
FIG. 22 illustrates an example User-Input Graphic Objects (UIGO) Palette display screen window.
Figure 23:
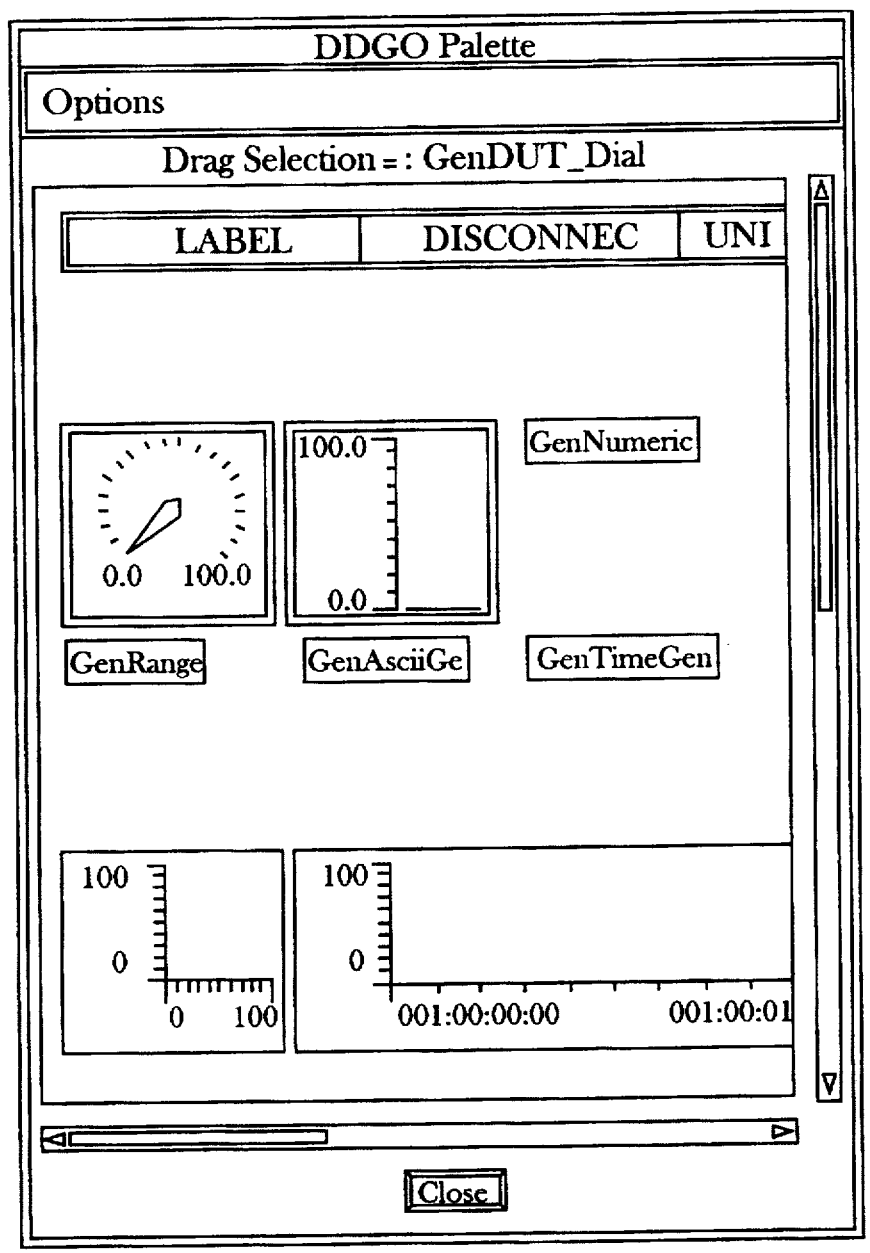
FIG. 23 illustrates an example Data-Driven Graphical Objects (DDGO) Palette display screen window.
Figure 24:
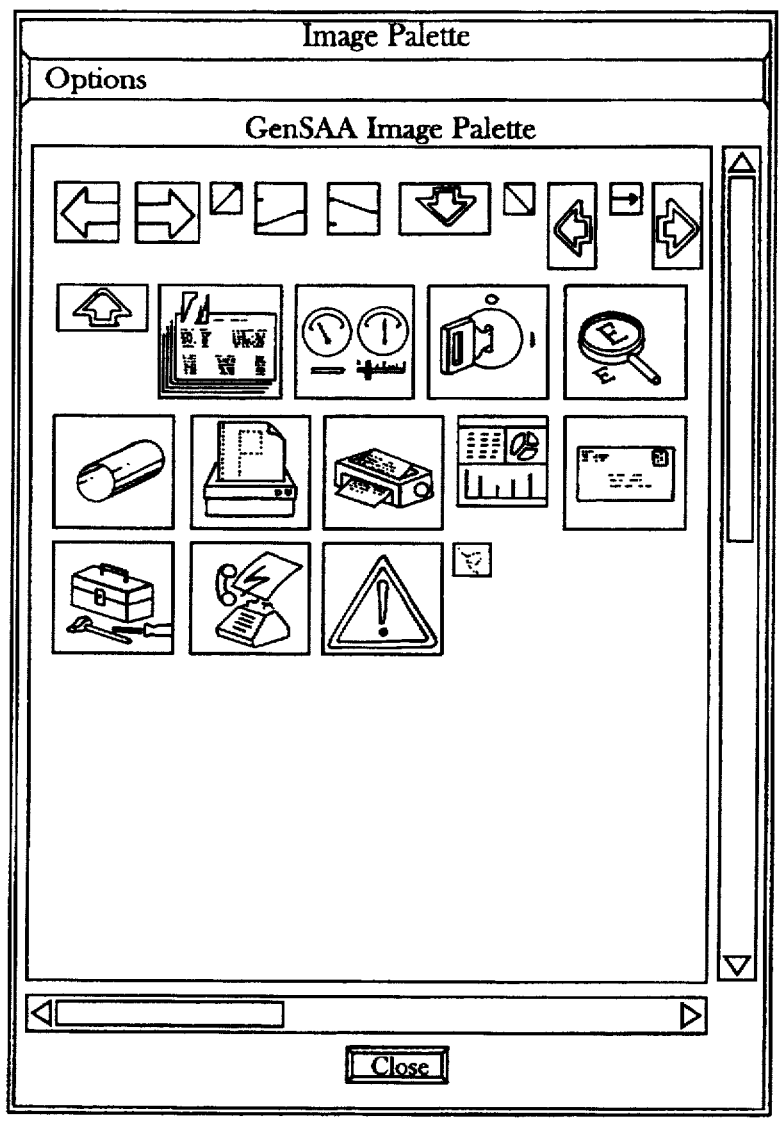
FIG. 24 illustrates an example Image Palette display screen window.
Figure 25:
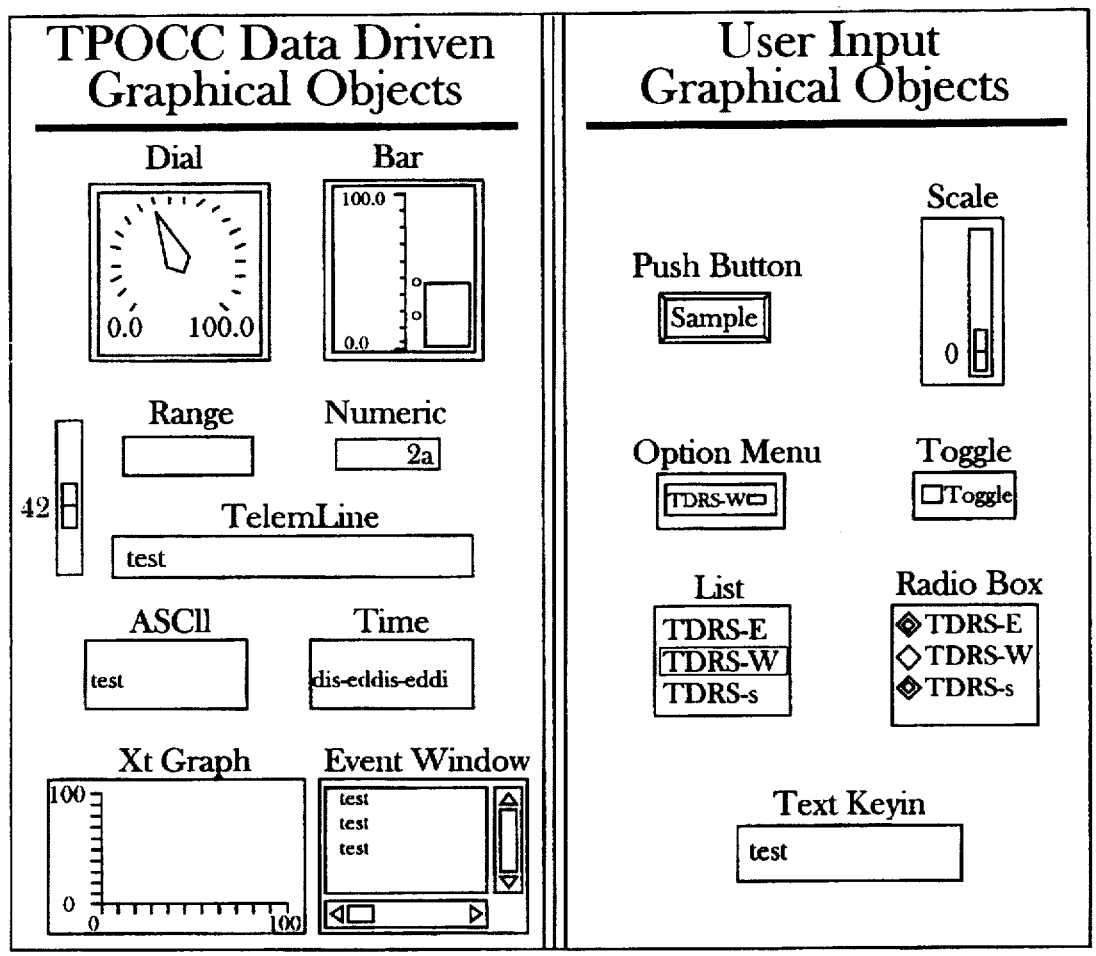
FIG. 25 illustrates several examples of UIGO and DDGO graphic objects.
Figure 26:
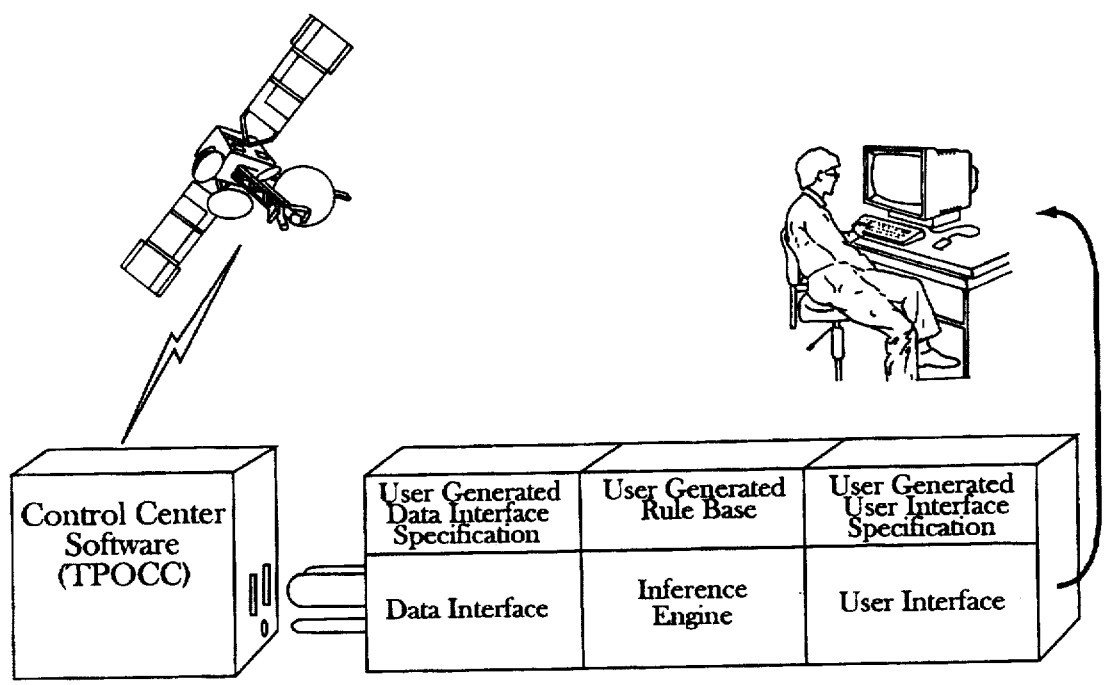
FIG. 26 illustrates a GenSAA expert system in operation.
Figure 27:
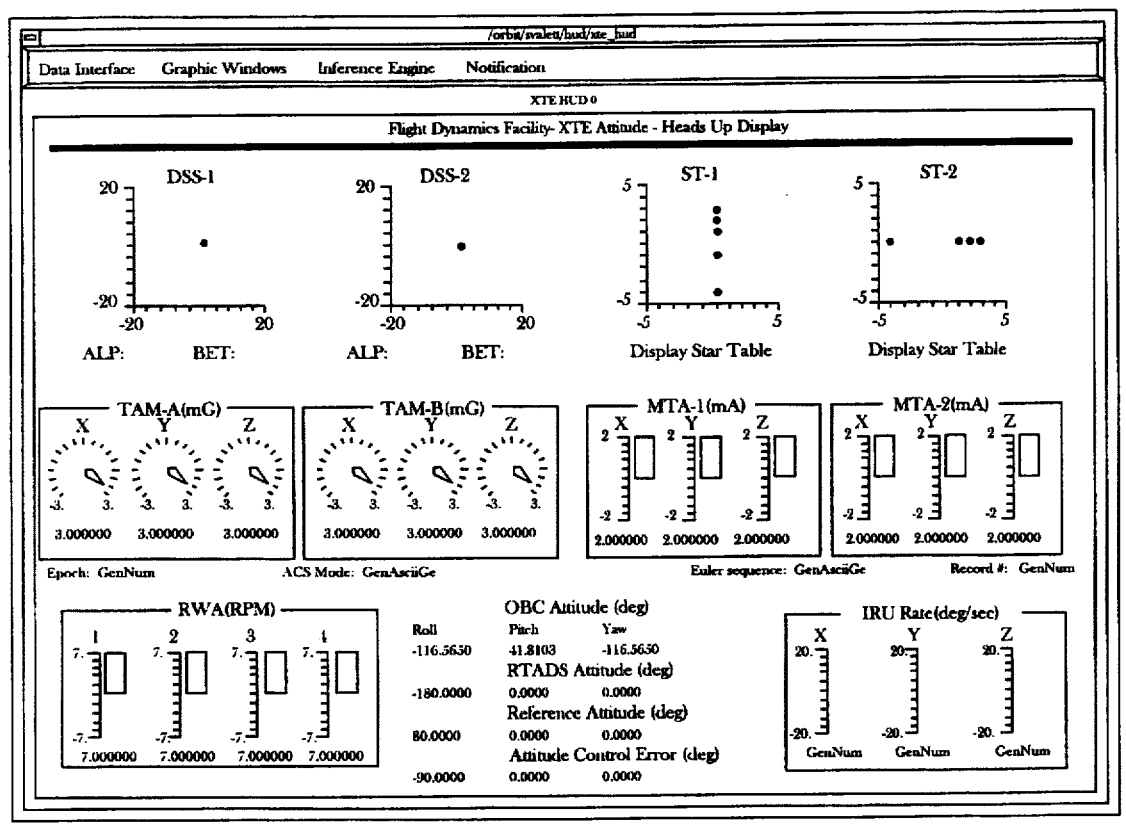
FIG. 27 illustrates an example GenSAA window (example #1)
Figure 28:
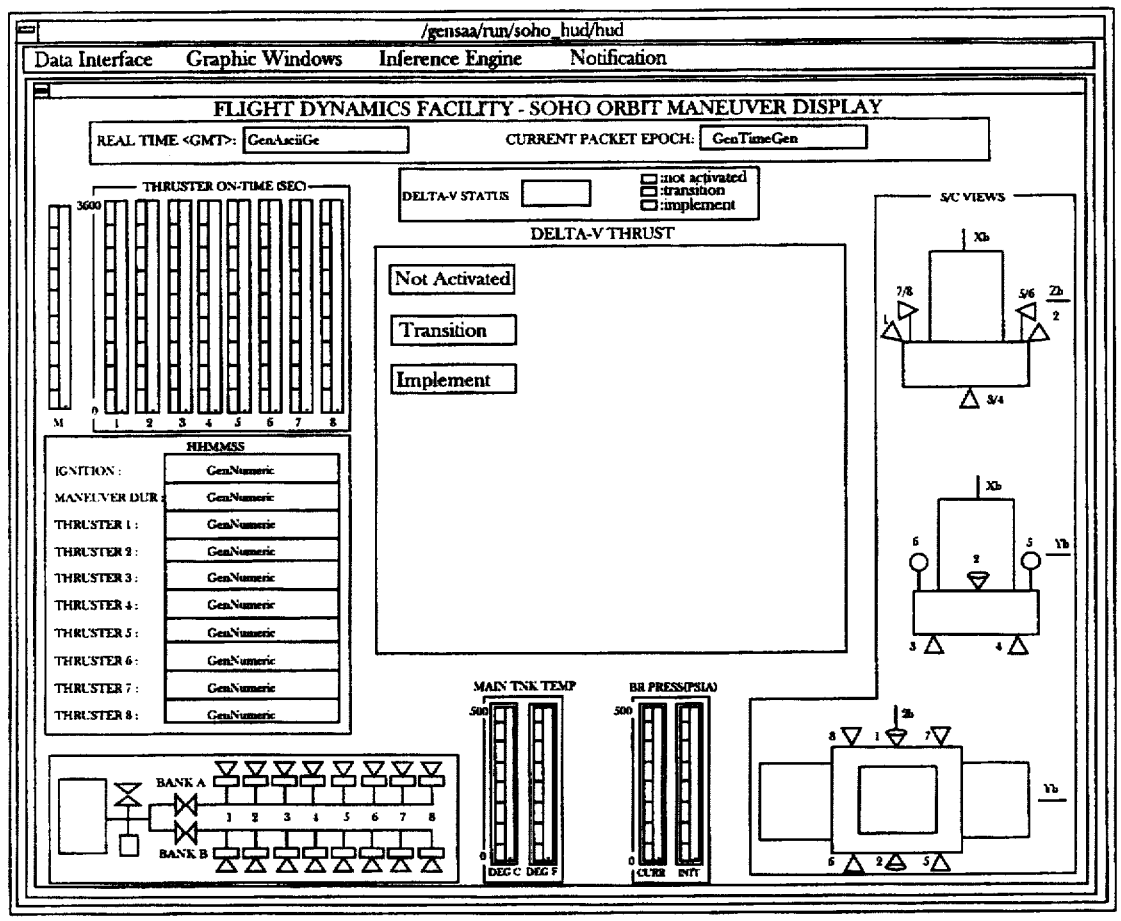
FIG. 28 illustrates an example GenSAA window (example #2)
Figure 29:
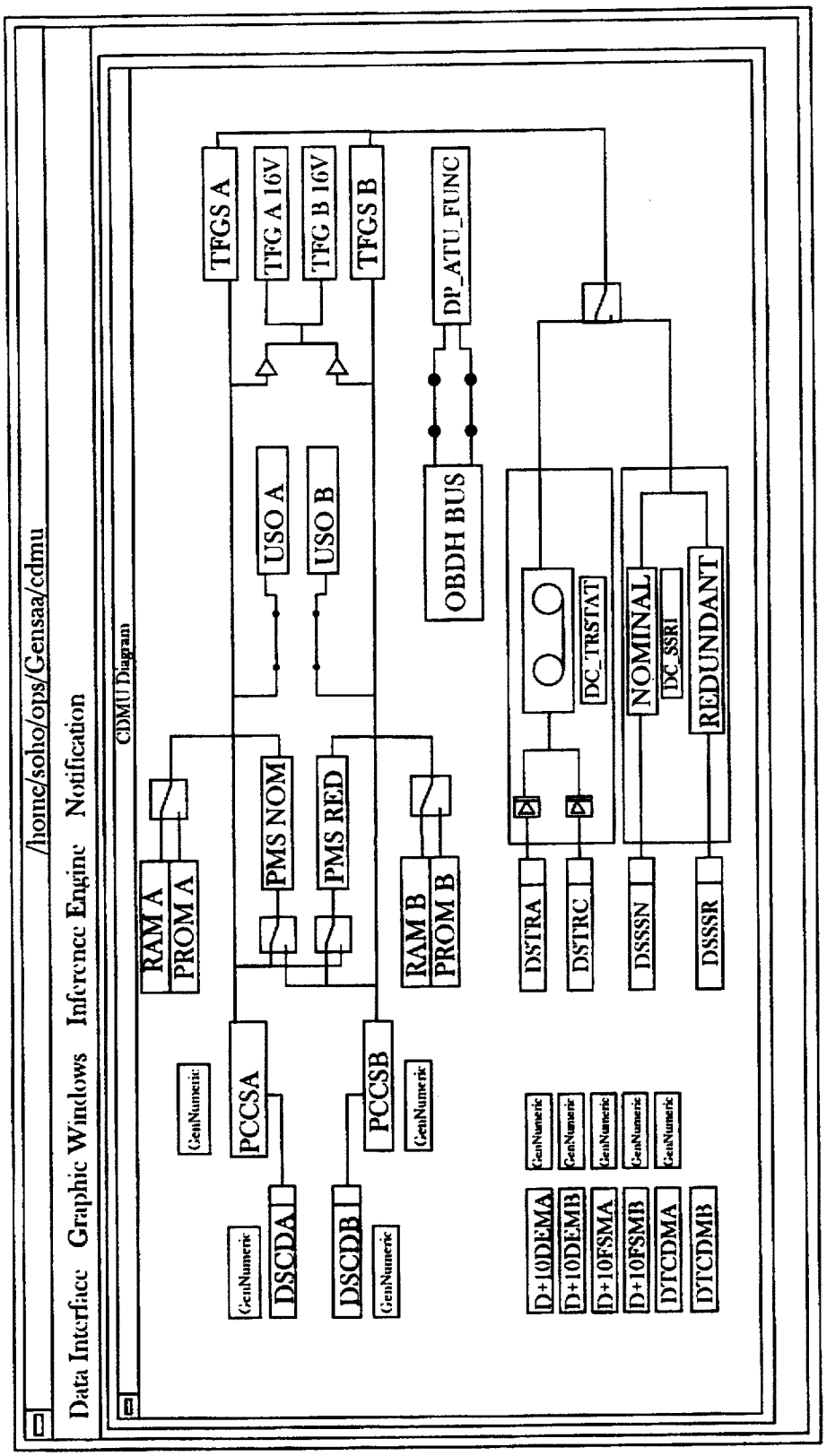
FIG. 29 illustrates an example GenSAA window (example #3)
Figure 30:
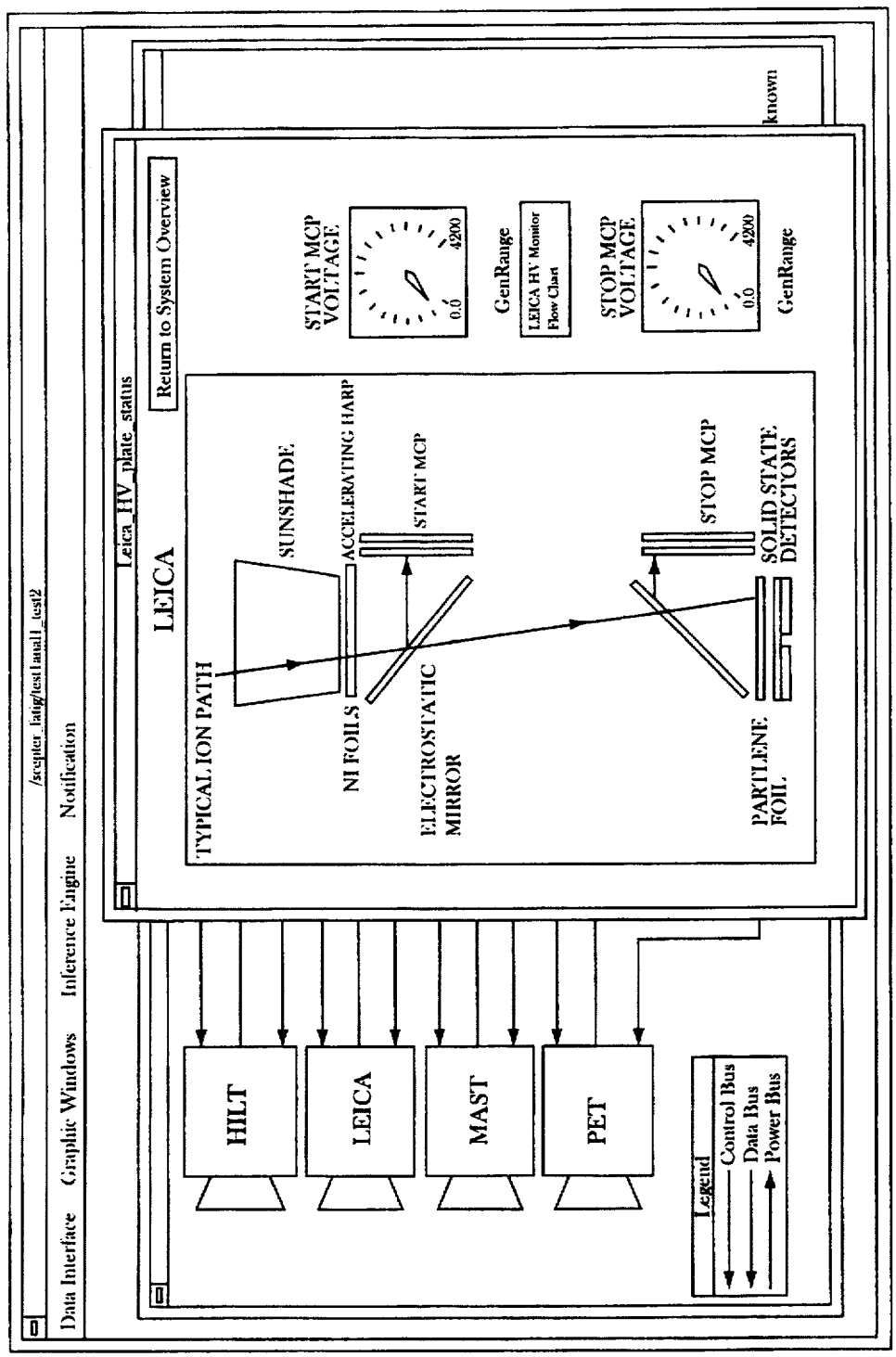
FIG. 30 illustrates an example GenSAA window (example #4)

During this process, prestored groups of graphical display elements are also displayed in step 94. These graphical display elements can be displayed in the form of a palette for example. There are three palettes from which graphical display elements may be selected. These are for selection of user-input graphical objects (UIGO), data-driven graphical objects (DDGO), and images. Images are a special type of data-driven graphical objects. FIGS. 22–25 illustrate these palettes, FIG. 22 illustrating an example of a UIGO palette, FIG. 23 illustrating an example of a DDGO palette, FIG. 24 illustrating an example of an Image Palette and FIG. 25 illustrating an example of a combined user-input graphical objects palette (left) and a data-driven graphical objects palette (right).

In step 96, it is determined whether or not a displayed graphical display element is one which is desired to be associated with the selected variable. If so, an appropriate graphical display element is selected in step 100 merely by selecting one of the graphical display elements from a palette utilizing the mouse of the input unit 8 and associating the graphical display element with a Mission, User-Defined, Inferred, or EGG data variable.

Graphical display elements can be dragged from one of the palettes shown in FIGS. 22–25, onto a GenSAA Window (GW). GWs are display screens that are built by the workbench user with a GW creation tool and the specific details added through the Graphic Window Details Panel of FIG. 19, for example. Their purpose is to present data in a graphical form to the user of the expert system when it is executing. FIGS. 27 through 31 illustrate examples of user interface displays of GenSAA Expert Systems which each contain one or more GenSAA windows. Specifically, the GW shown in FIG. 27, for example, was built by first dragging the x-y graphs, the dials, and the bar charts from the data-driven graphical objects palette (of FIG. 25) onto an empty GW. The GW was completed by using the drawing tools in the User Interface Builder 26 to add the labels and miscellaneous border lines.

Figure 20:
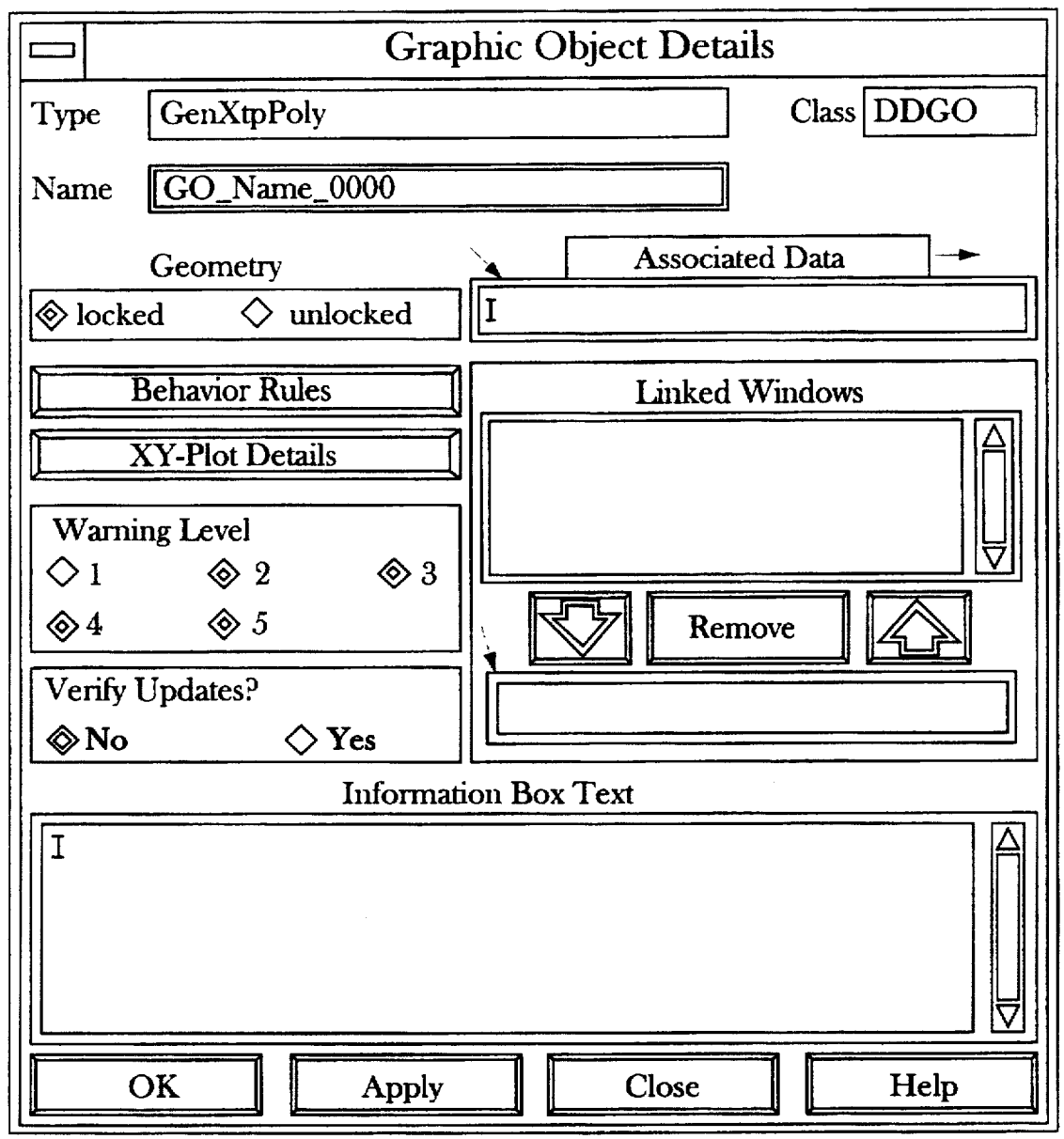
FIG. 20 illustrates the Graphic Object Details display screen window.

In a similar manner, variable names can be dragged, utilizing the mouse of the input unit 8, from displayed fields of the data interface specification 34 in what is known as a Data Manager control panel. FIG. 11 illustrates the main Data Manager Panel from which data variable names may be dragged. The variable names are dragged to the Graphic Object Details panel, which is illustrated in FIG. 20. When a workbench user drags a variable name in this fashion, it has the effect of associating the variable name with the graphical display objects.

Subsequent to this association between variable and graphical display element, it is determined whether or not a modification is desired in step 102. If so, the graphical display element is modified in step 104 and associated with the selected variable as previously mentioned in step 106. A graphical display element can be modified in several ways as will be explained as follows.

Figure 17:
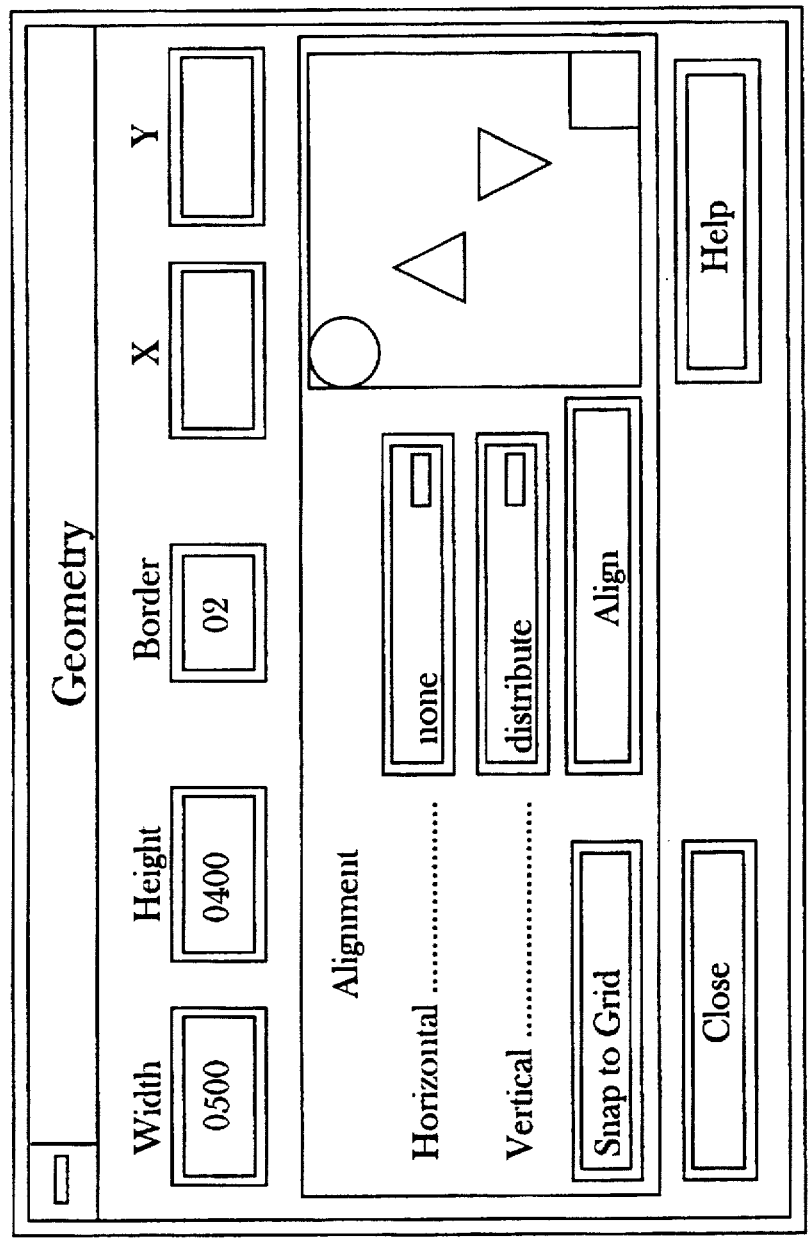
FIG. 17 illustrates the Geometry Panel display screen window.
Figure 18:
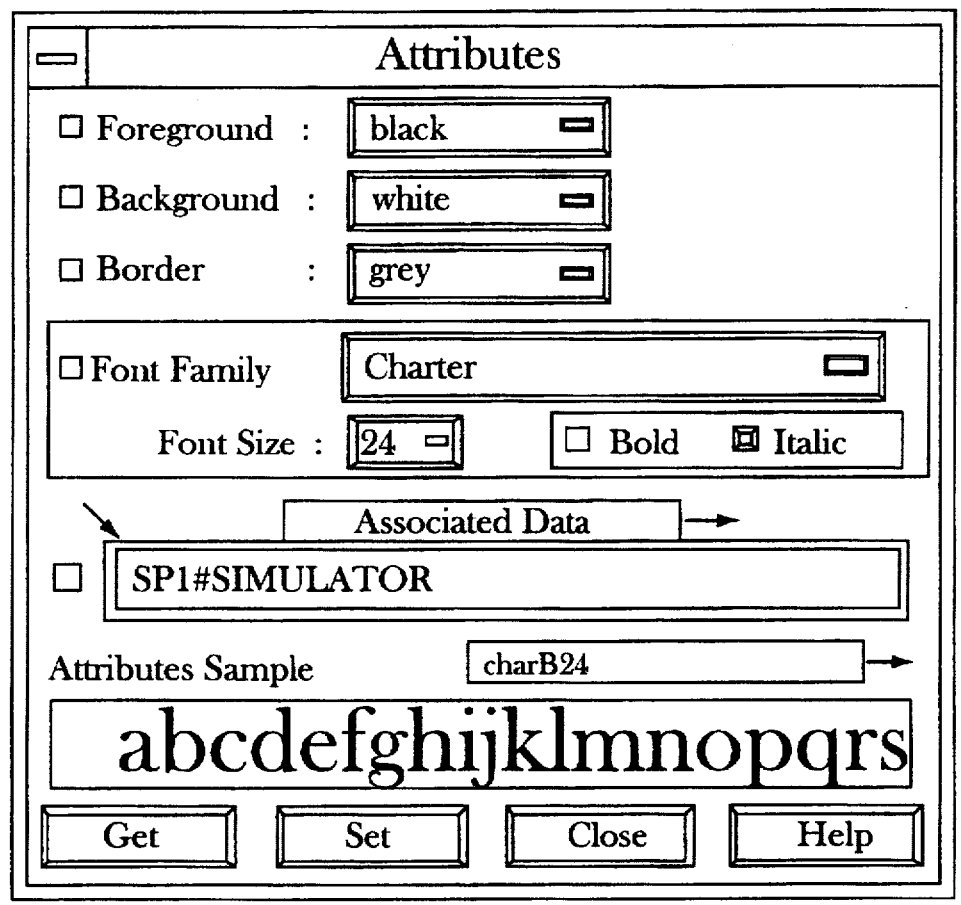
FIG. 18 illustrates the Attributes Panel display screen window.

The location of an object can be changed by clicking with the mouse on the graphical display element to select it, and then dragging the graphical display element with the mouse pointer to a new position. The dimension of a graphical display element can be changed by clicking with the mouse on the element to select it, and then dragging one of its selection handles with the mouse pointer to change the size of the element. The location and dimension of a graphical display element can also be changed by using the controls on the Geometry Panel, which is shown in FIG. 17 for example. The foreground, background, and border colors of a graphical display element can be changed by using the color controls on the Attributes Panel, which is shown in FIG. 18 for example. Further, the font family, size, and style of a text display element can also be changed using the font controls on the Attributes Panel of FIG. 18.

Alternately, if the displayed graphical display elements do not include one which is desired to be associated with a selected variable as determined in step 96, an appropriate graphical display element can be created in step 98. This can be done by drawing an appropriate graphical display element using particular drawing tools. For example, the GenSAA Workbench provides the following drawing tools for constructing drawable graphical display elements: Static Text tool; Multi-Segmented Line tool; Polygon tool; Rectangle tool; Rounded-Cornered Rectangle tool; and Ellipse tool.

Drawing editors can be provided, for example, for creation of new graphical display elements such as icons for example, of for modification of existing graphical display elements. Display elements which can by modified by an editor are image display elements. Two such examples of editors, either of which can be used to modify an existing image display element or create a new one, are:

1. The Pixmap/Image Editor (PIE) provided with the GenSAA. This off-line editor allows the creation or editing of image display elements in two forms: bitmaps or 256-color pixmaps.
2. The bitmap editor provided with the X-Windows System.

After one of these editors is used to create a new image display element or modify an existing image display element, the image display elements can be placed in the image palette of FIG. 24 for example.

Figure 5B:
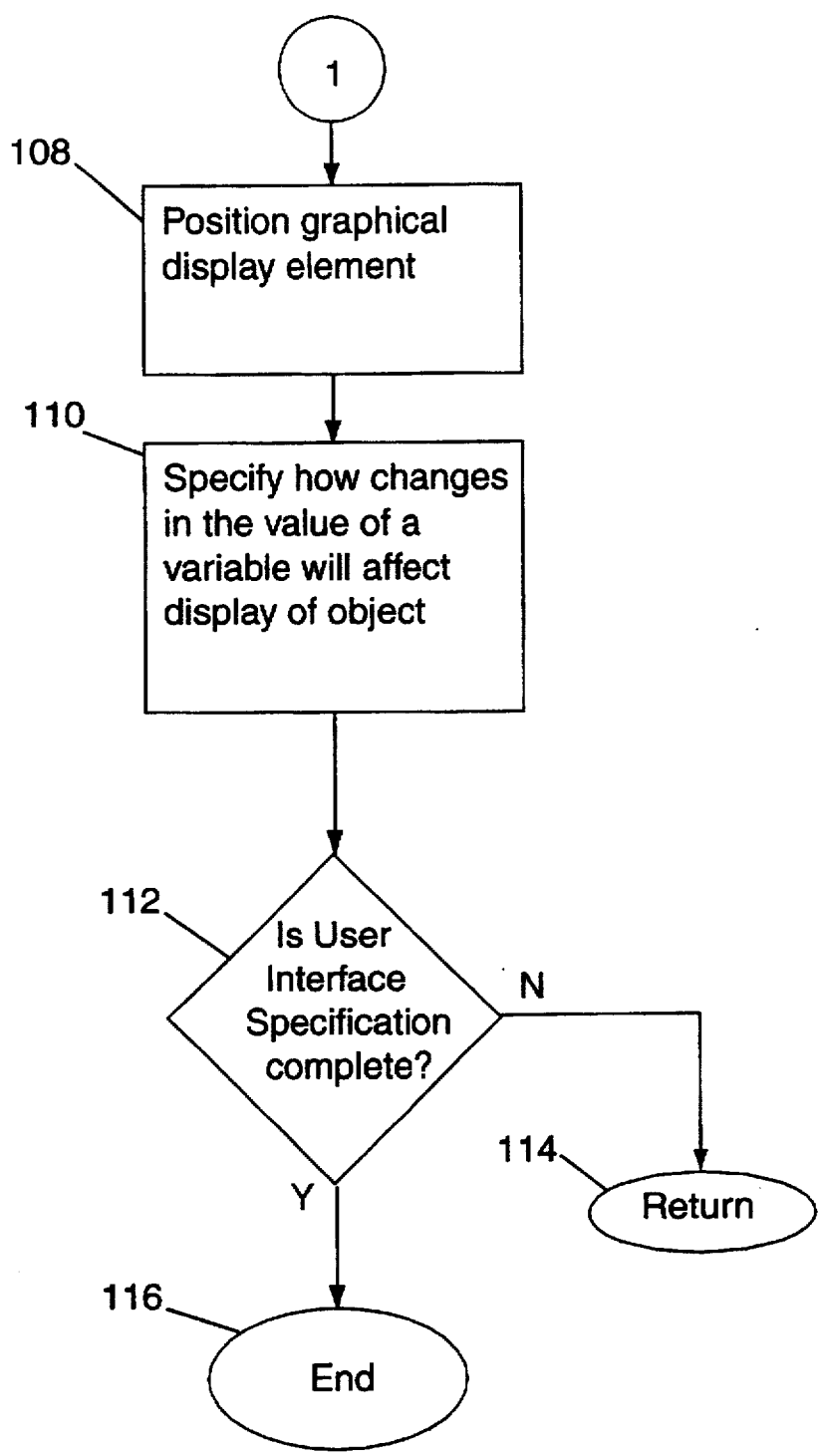

Next, as shown in FIG. 5B, a selected graphical display element can then be positioned as desired in step 108. This will be explained further as follows.

The user of the GenSAA Workbench places and positions every graphical display element within a Graphic Window (GW). The collection of graphical display elements in a GW comprises a diagram, schematic or data presentation that represents a physical or logical device or system; a process; or a data input or output display. The graphical display elements are the components of the diagram, schematic or data presentation.

Graphical display elements can be repositioned in several ways. The easiest is by selecting the element(s) and dragging it/them with the mouse of input unit 8 to new coordinates. Keystrokes of a keyboard of input unit 8 provide a similar capability for more precise positioning. Alternatively, the user may directly specify the coordinates via the "Geometry Panel" (se FIG. 17). A third method involves aligning one or more elements in either the X-direction, the Y-direction, or both. Repositioning may also occur by snapping graphical display elements to grid-lines.

Next, in step 110, a user can specify how changes in the value of a variable will effect display of an object. For example, presentation of the object may change based upon particular received data values of the associated variable. Characteristics of the graphical display element behavior that can change based on the data value of its associated data variable include, but are not limited to, color, the particular icon displayed, and/or the position of a dynamic portion of a data driven object such as a meter, gauge, or a miniature strip chart for example. A more detailed discussion is as follows.

There are two basic types of graphical objects:
those associated with user-input; and
those providing data-display.

The visible characteristics of user-input graphical objects (UIGO) change as the user manipulates them. For example, a set of radio buttons will display an alternate selection when the user clicks on one of the unselected buttons. Option menus behave in the same manner. Text key-in fields display the character string that is entered by the user.

Figure 21:
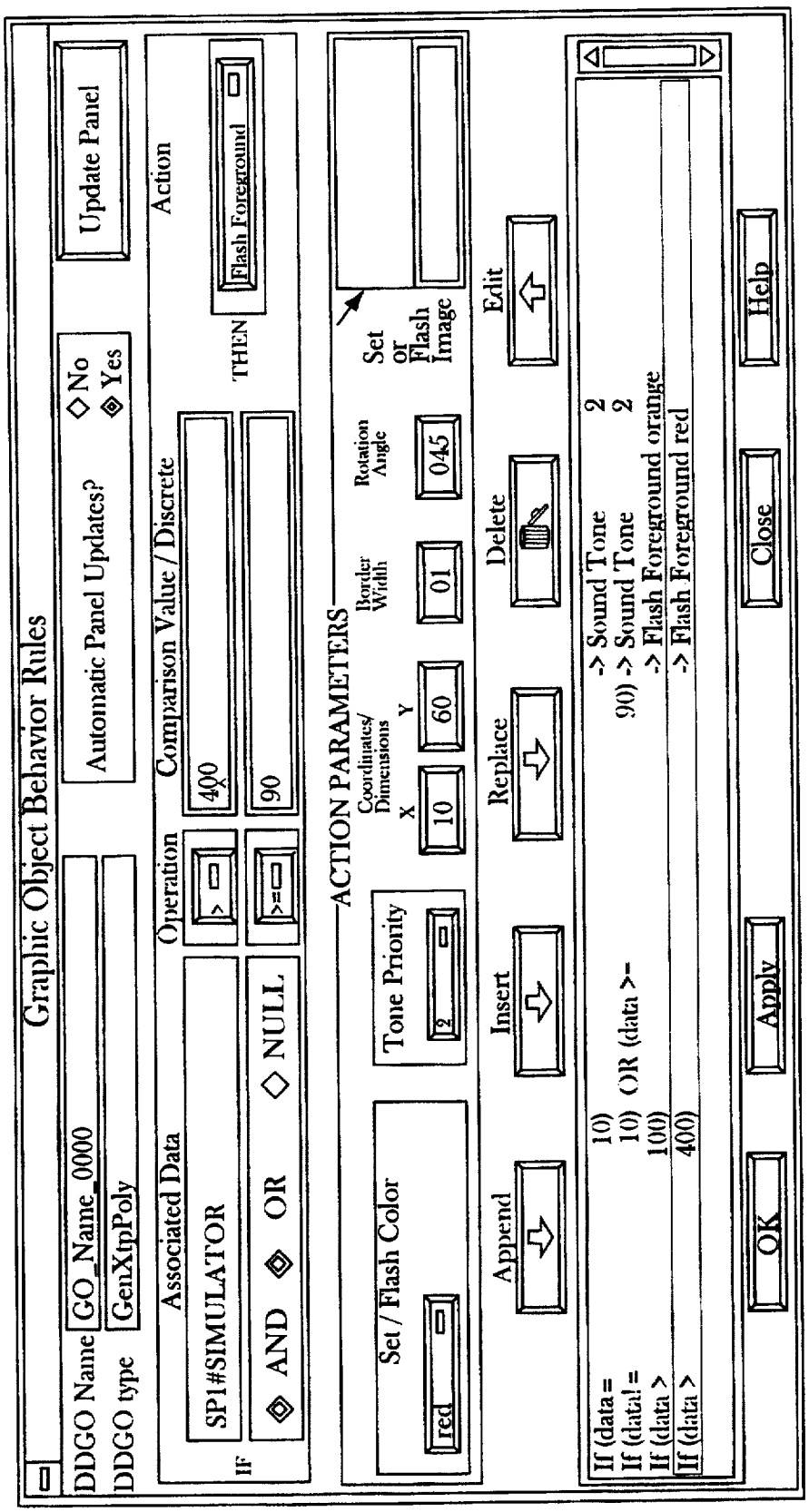
FIG. 21 illustrates the Graphic Object Behavior Rules display screen window.

The characteristics of a data-driven graphical object (DDGO) may also change, but this is based on the current data value of its associated data variable. This type of object may have "behavior rules" (not to be confused with CLIPS rules) associated with them. Such rules are defined in the "Graphic Object Behavior Rules Panel" of the Workbench (see FIG. 21). Behavior rules are of the form "IF ( . . . ) THEN ( . . . )". The "IF" clause performs a comparison between the current data value of the associated data variable of the object and a specified constant numerical value or string value. The comparison can be any logical operation, including, but not limited to: equal, not-equal, greater-than, lesser-than, and others. The "THEN" clause specifies that certain changes should occur to the object when the "IF" clause is satisfied. These changes include, but are not limited to:

Making the object visible or not visible;
Altering the foreground, background, or border color of the object;
Flashing the foreground, background, or border color of the object;
Modifying the position or dimensions of the object;
Rotating the object;
Changing the image displayed for an image object; and
Sound a tone.

Some data-driven objects also reflect the current data value of its associated data variable in other ways. For example, a dial object will change the position of its needle, and a bar-graph object will change the length of its bar, to reflect the current data value of its associated data variable.

Finally, in step 112, it is determined whether or not the user interface specification is complete. If not, the system is returned in step 114 to the beginning step 88. If so, it is ended in step 116.

Figure 6:
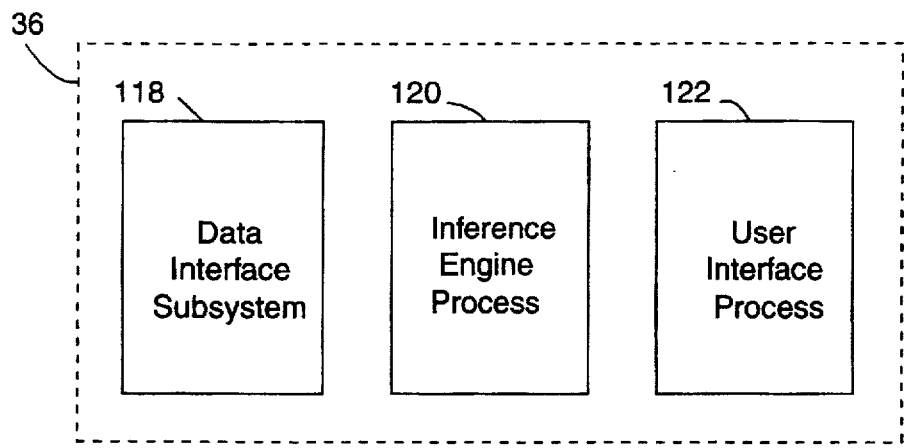
FIG. 6 illustrates the specific run-time components which can be used to run the expert systems created.

FIG. 6 illustrates the elements of the run-time framework 36, including the data interface subsystem 118, the inference engine process 120, and the user interface process 122. As previously mentioned, each of the elements of the run-time framework can be stored in an external memory in a remote unit 16 of FIG. 1, and can be used to run multiple expert systems. The run-time framework 36 is a run-time executive providing the basic operational environment for a GenSAA expert system. The components 118, 120, and 122 can be used without change in each of a plurality of created GenSAA expert system and the components control operation of the GenSAA expert system during its execution. Each of the run-time components uses files created by the workbench, including the data interface specification, rule base, and user interface specification stored in the memory 6 of the workstation 2.

The GenSAA workbench creates a set of files that define the expert system being built. The following files are created by the workbench and are then read by the GenSAA runtime framework in order to execute the expert system:

| Filename | Contents |
|---|---|
| .mis | mission variables selected in the Data Manager 22; |
| .ud | User-Defined variables specified in the Data Manager 22; |
| .inf | inferred variables specified in the Data Manager 22; |
| .egg | externally-generated GenSAA variables specified in the Data Manager 22; |
| .clp | rule base 32 created by the Rule Builder 24; |
| .uif | user interface specification 34 created by the User Interface Builder 26; |
| .ges | resource names for the expert system specified by the workbench 20; and |
| .map | color map for the expert system displays. |

The first four files (.mis, .ud, .inf, .egg) comprise the data interface specification 30. All the files are in ASCII format, except for the user-interface specification file (.uif). In the interest of performance (i.e., rapid loading) this file is in binary format; however, it can optionally be written in ASCII format to facilitate transferal across hardware platforms.

The elements of the GenSAA run-time components 36 control operation of a GenSAA expert system during its execution in a TPOCC control center. The elements 118, 120, and 122 read the data interface specification 30, rule base 32, and user interface specification 34, respectively, created for a particular expert system 28 to determine the specific behavior of the GenSAA expert system during operation.

The GenSAA run-time framework is preferably implemented as a pair of Unix processes that communicate with one another via Unix sockets. The GenSAA run-time components or elements will be described in relation to their function with regard to FIGS. 7A, 7B and 7C.

The data interface subsystem 118 beings its process in step 124 and in step 126 it reads the data interface specification 30 of an expert system created. Thereafter, in step 128, it requests data from an external data source as specified by the data interface specification. For example, Mission data can be requested from a TPOCC data server as specified in the data interface specification 30.

The TPOCC Data Server accepts requests from processes for data updates for its known variables. The user specifies the update frequency as well as the variable name. This only applies to Mission data variables, as TPOCC known nothing of GenSAA-specific variables (Inferred data, User-Defined data, and EGG data variables). Externally Generated GenSAA data variables (EGG data) consists of Inferred and User-Defined variables defined in other GenSAA expert systems and made available to any other GenSAA expert system interested. To do this a "GenSAA Data Server" is provided. This can be a duplicate of the TPOCC Data Server. However, it knows nothing about Mission data—it can only reference data exported to it as EGG data.

In step 130, the data interface subsystem 118 then formats real-time data received based upon the variables constructed in the data interface specification 30. The data values are then distributed in step 132 to inference engine and user interface processes. The Inference Engine Process (IEP) is created at runtime by the User-Interface Process (UIP), which controls execution of the GenSAA expert system. The IEP is activated as a child process of the UIP, which is also its only external interface. The IEP need not be located on the same host as the UIP.

The UIP passes to the IEP a copy of all mission data it receives from TPOCC; it passes this data through a UNIX socket for example. The purpose of the IEP is to utilize the "C" language integrated production system (CLIPS) software of NASA to examine this data and apply it to the defined rule base. Any inferences which it makes in the modification if inferred variable values, are sent back to the UIP so that it may update the display characteristics of any objects associated with them. The IEP may also generate user-messages as a result of its rules firing. These, too, are sent to the UIP for display.

The inference engine is the primary component of the Inference Engine Process, for example. The inference engine determines when each rule in the rule base should fire, i.e. be executed. The inference engine continually examines the conditions on the left-hand side (the "if" clause) of each rule and determines when these conditions are satisfied. The conditions may include logical tests on the current values of Mission data variables, User-Defined data variables, Inferred data variables, and EGG data variables that are received from the User-Interface Process, for example. When the inference engine determines that all the conditions in a particular rule are satisfied, the inference engine places the rule on a rule agenda.

Rules are placed on the agenda according to their priority, called "salience". The top-most rule on the rule agenda is fired, i.e. executed. When the inference engine fires a rule, it performs the set of actions that are specified on the right-hand side (the "then" clause) of the rule. Actions may include setting a new value for an Inferred data variable, or generating a user message, for example. New values for Inferred data variables and user messages are sent to the User-Interface Process.

Further, the Data Interface Subsystem (DIS) 118 can be implemented as a sub-element of the UIP 122. The DIS contains the instructions necessary for receiving and sending all types of data with external entities. It is that part of the User-Interface Process (UIP) which performs the following:
  requests Mission data from the TPOCC Data Server;
  receives Mission data from the TPOCC Data Server;
  requests EGG data from the GenSAA Data Server;
  receives EGG data from the GenSAA Data Server;
  sends exported data to the GenSAA Data Server;
  sends Mission data to the IEP;
  sends User-Defined data to the IEP;
  sends EGG data to the IEP;
  receives Inferred data from the IEP; and
  receives user messages from the IEP.

Figures 7A, 7B, 7C:
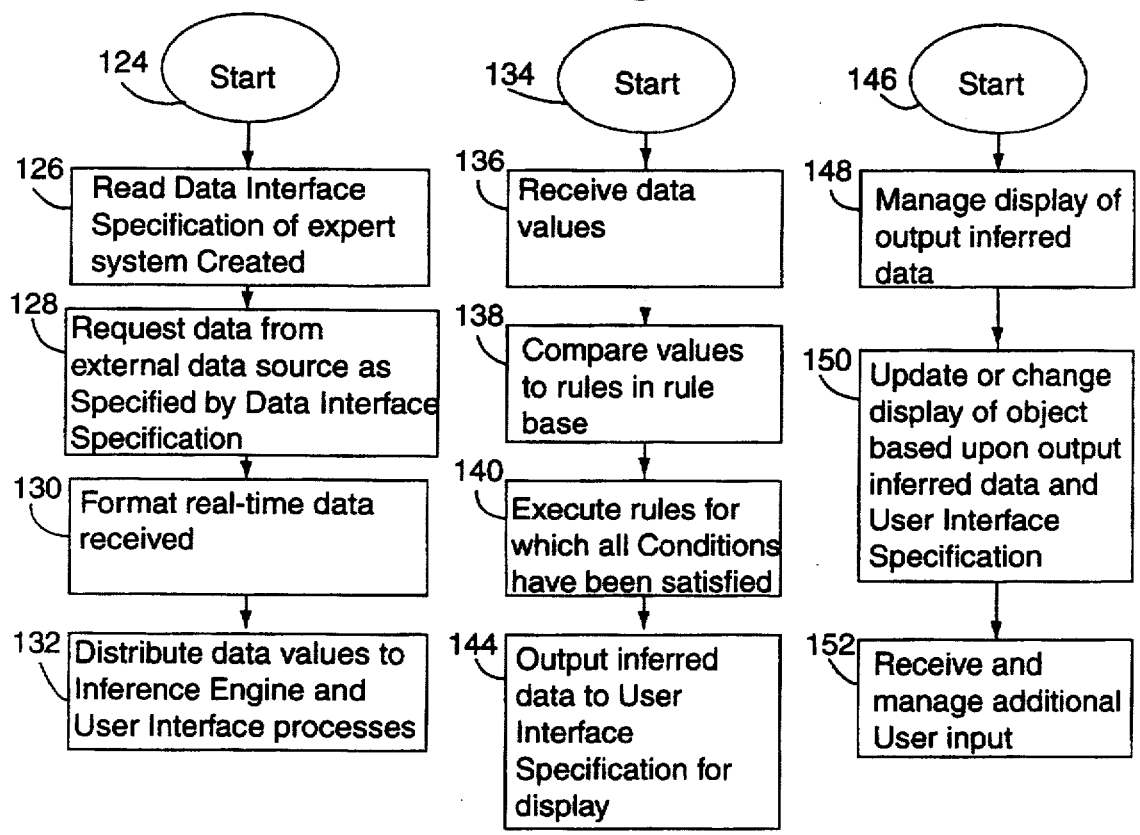
FIGS. 7A–C illustrate the process performed by the data interface subsystem, the inference engine process, and the user interface process of the run-time components of FIG. 6.

FIG. 7B illustrates the process executed by the IEP 120. The IEP manages the firing of rules in a rule base based upon distributed data values satisfying conditions of rules in a rule base 32 of an expert system 28 as explained above. A rule is fired when all its conditions are satisfied. Conditions often involve current data values of Mission, User-Defined, Inferred, and EGG data variables. Inferred facts (data) and messages may be sent to a user interface and displayed to a user as defined in the user interface specification 34 of an expert system 28. Preferably, the "C" language integrated production system (CLIPS) inference engine, of NASA, forms the core of this component as previously explained.

The IEP 120 begins in step 134 and data values are received in step 136 as distributed by the DIS 118 in step 132. In step 138, these data values received are compared to rules in the rule base. In step 140, rules are executed upon all of the conditions of the rules being satisfied. The inference engine manages the matching of the conditions to the rules in the rule base as well as the firing of the rules upon all conditions of a rule being satisfied.

Next, if a rule is executed in step 140, output can then be made to a user interface specification 34 for subsequent display in step 144. This output can include inferred facts and messages or can further include the output of inferred data variables. The output, depending on the initial design of the expert system, can further modify existing displayed graphical display elements.

The CLIPs inference engine of NASA forms the core of the Inference Engine Process (IEP) as stated above. The IEP handles receipt of data values from the UIP and packages them for input to CLIPS. The CLIPS software determines which rules reference the specified variable and whether or not the corresponding value causes these rules to 'fire'. Rule 'firing' merely refers to the satisfaction of the rules' conditions.

Upon 'firing', the 'THEN' clause of a rule is executed. This may involve the setting of an inferred variable, the generation of a user-message, and/or the modification of existing graphical display elements for example. In any case, the action result is sent by the IEP to the UIP. The DIS component of the UIP receives these results and distributes them to the message window, in the case of a user-message, or to the graphical display elements or objects which reference the inferred variable so that their display characteristics may be updated. Each graphical display object is a self-contained entity (known in the X-Windows world a "widget") which has sufficient knowledge built-in to control its display. Widget display attributes handled by associated behavior rules are updated by UIP control software.

Finally, in FIG. 7C, the UIP 122 is described. This process begins in steps 146 and in step 148, the display of output Inferred data such as facts or messages are managed in step 148. The UIP further handles user input and manages display of windows, including both text and graphics. This refers to the handling of user input via user-input type graphical objects (UIGO). These may be graphical (such as radio buttons, selection lists, and option menus for example) or text (key-in entry fields for example).

Management of the display of windows refers to GenSAA Window (GW) control. Examples of generated GenSAA Windows are shown in FIGS. 27 through 31. GWs are the canvas on which graphical display objects are placed. They are the parent windows of graphical objects. Their visibility is controlled by the user during Runtime execution. Any particular GW may be displayed on command or hidden to free-up display area. Their purpose is to enable portions of the expert system to be viewed rather than requiring one large display of everything.

Finally, in step 150, the UIP 122 updates or changes the display of an object such as a graphical display element based upon output Inferred data from a fired rule in the user interface specification 34. The UIP updates visual attributes of graphical display elements as designated by the user interface specification 34. Finally, as previously explained, the UIP 122 also receives and manages additional user input data in step 152.

The user interface windows displayed on a display unit 10 to a user (such as those shown in FIGS. 27–31 for example), the data driven objects (such as those shown in FIG. 25 for example), and the user-input graphical objects (such as those shown in FIG. 25 for example) are defined in the user interface specification 34 generated by the GenSAA User Interface Builder 26 as previously described. The user-input graphical objects refer to display objects providing a means for user control. Examples of these include push buttons, radio buttons, check boxes or toggle buttons, option menus, selection lists, text key-in fields, and scales or sliders.

Further, the user interface specification 34 can include color schematics and animated data driven objects (eg., rotating meters, sliding bargraphs, and strip charts) that graphically display the dynamic values of Mission data, User-Defined data, and Inferred data for example. Typically, the user interface specification 34 further includes hypergraphic links to make it easy for spacecraft analysts to quickly display graphic windows.

One of the details which may be associated with a data-display graphical object, and specified in the "Graphical Object Details Panel" (FIG. 20) in the GenSAA Workbench, is a list of "hypergraphic links" or, more appropriately, "Linked-Windows". A Linked-Window is simply the name of a GenSAA Window (GW). During Runtime execution the user may, be mouse button of input unit 8, command the UIP to display all Linked-Windows associated with a specific data-display graphical object (DDGO). This will result in making these GWs visible on the screen. The purpose of this is best understood by considering the following example.

An expert system may contain a graphical representation of a very complex and detailed spacecraft subsystem. This may alternatively be computer components or any schematic diagram of a similar nature. Since the display of all components may be unreasonable—they would have to be very small in order to get all in one window—or even impossible, the graphical objects representing the components must be allocated to different GWs. A hierarchy of graphical objects may then be devised, each sub-window containing a portion of the whole in greater detail. This is not unlike diagrams which contain blow-ups of certain features. The linkage feature provides the access method. By clicking the mouse on the top-level object, a GW of slightly more detail is displayed. Clicking the mouse on one of the objects within this level results in another GW appearing with detail associated with its components. This process may be taken to any number of levels. The term "hypergraphic" refers to this access method.

Figure 8:
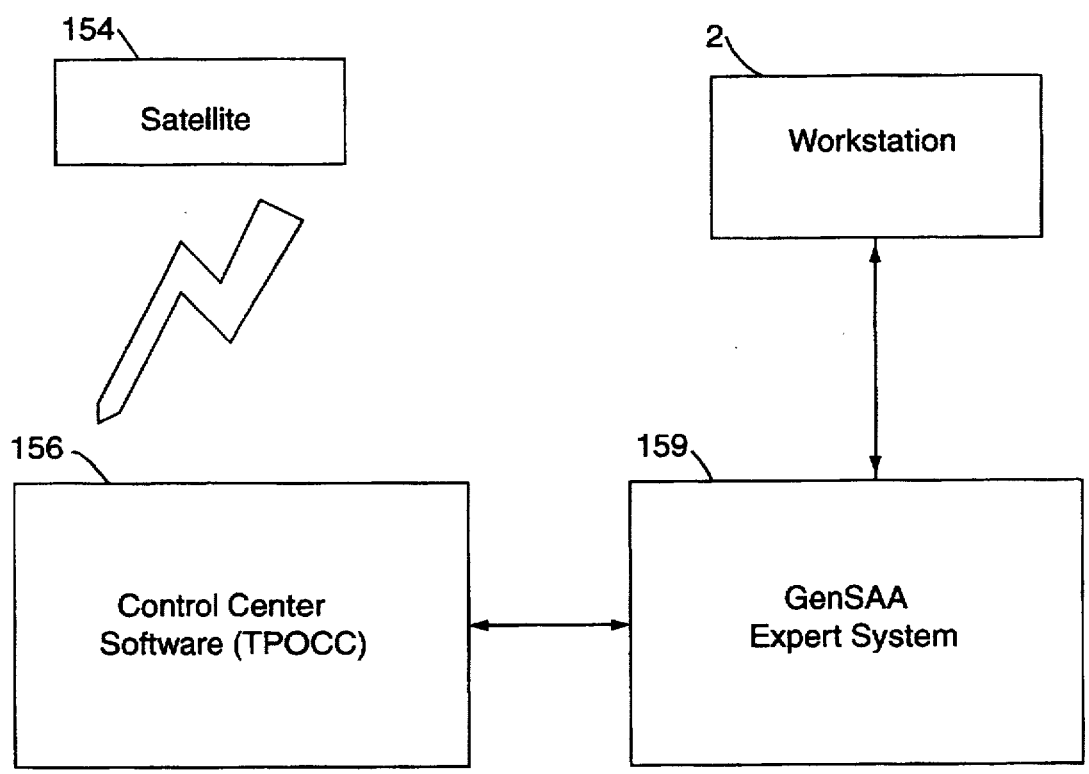
FIG. 8 illustrates one exemplary aspect of hardware utilized in satellite monitoring using an expert system created by system and method of the present application.

Next, operation of a GenSAA expert system will be described with regard to FIG. 8 of the present application. FIG. 8 illustrates a workstation terminal 2 on which a GenSAA expert system has been created. The GenSAA expert system preferably operates on a Unix workstation using an X Window system in a TPOCC control center. It should be noted that the GenSAA Workbench is an off-line utility, and thus can be used to build expert systems in any of several environments (i.e., a Sun SPARC or HP UNIX workstation running X-Windows and Motif). GenSAA expert systems need not be built in a TPOCC control center.

The Runtime Framework requires a network interface to a TPOCC data server, which may be local or remote from the expert system. A TPOCC data server is usually found in a TPOCC control center, although it can be used in other environments where a GenSAA expert system 159 could be used, such as an industrial process control environment.

Further, it should be noted that a dedicated Unix workstation is not required. Still further, a GenSAA expert system can be executed on the same workstation as other TPOCC processes. To avoid potential performance impacts, the initial GenSAA expert system 159 resides on a dedicated Unix workstation connected to TPOCC Local Area Network (TPOCC LAN).

During operation, the GenSAA expert system 159 from workstation 2 interfaces to TPOCC software 156 at the TPOCC control center via a TPOCC data server process executed by TPOCC data server. The TPOCC data server includes, for example, the run-time components 36 previously described with regard to FIGS. 6 and 7 necessary to drive the expert system.

The interface via the TPOCC data server process uses standard external interface connections defined by the TPOCC project. The interface to the TPOCC Data Server occurs via UNIX sockets, for example. TPOCC provides a library of software for accessing its connections and formatting messages. The GenSAA expert system on the workstation 2 operates by sending in requests to the TPOCC data server process of the TPOCC data server for the mission or telemetry data required as designated by its variable selected.

Mission variables are the names of spacecraft data points or of ground data system data points for example. A Mission variable might describe the temperature at a location onboard the spacecraft, or the voltage or current at a location in electrical circuitry of a spacecraft, or other characteristics of a spacecraft, or characteristics of the ground data system, for example. Current values for Mission variables are received from the TPOCC data server. A file called the System Variable Table (SVT) lists the Mission variables that are available from the TPOCC data server.

The SVT is read by the GenSAA Workbench and displayed to the user in the Data Manager panels. The workbench user selects a subset of the available Mission variables to be used in the GenSAA expert system. When the expert system begins execution, it requests from the TPOCC data server the current values for the subset of Mission variables previously selected by the workbench user.

The appropriate data is received from satellite 154, for example, through control center software 156 and back through TPOCC data server to eventually be used in writing or operating the expert system on workstation 2. Spacecraft data is received by Control Center software within the TPOCC. GenSAA expert systems may request updates of any or all of the Mission data TPOCC receives. These data are sent at the update interval specified by the TPOCC Data Server to all systems which have requested them. The interface occurs via UNIX sockets. It is the Data Interface Subsystem (DIS) component of the GenSAA Runtime User-Interface Process (UIP) which receives Mission data updates. The DIS sends variable values received to each graphical display object, or widget, which the user associated with the variable name. Upon being notified of a change in its data value, each widget updates its display characteristics. The UIP also examines the behavior rules associated with these objects and, if appropriate, informs the graphical objects to alter specific attributes, such as colors for example.

Figure 9:
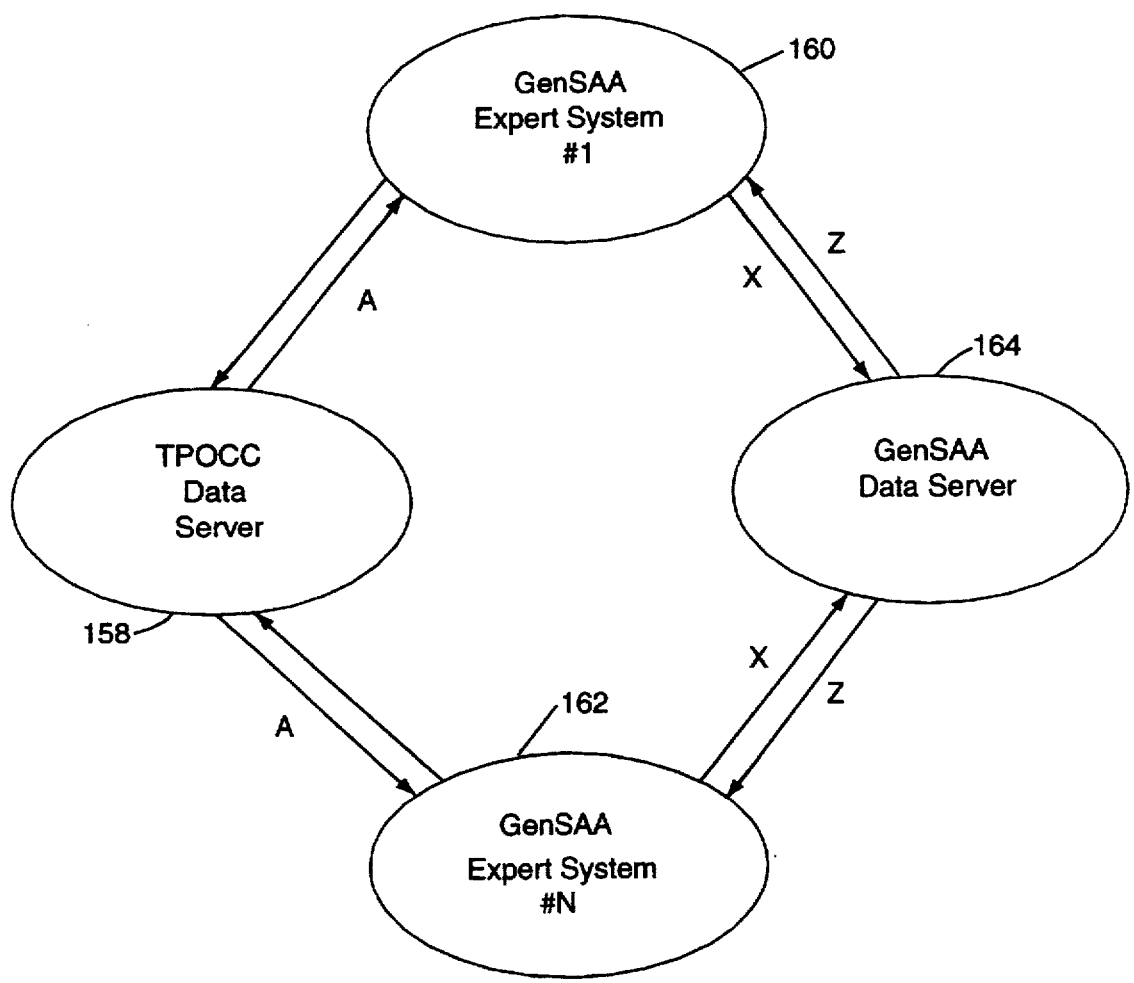
FIG. 9 illustrates various aspects of making information available to multiple expert systems.

FIG. 9 illustrates cooperation capabilities between a plurality of GenSAA expert systems. Element 160 of FIG. 9 illustrates a first GenSAA expert system, and element 162 illustrates an "Nth" GenSAA expert system, wherein N=2 for example. It should be noted that N can be any integer such that many expert systems can cooperate and work together to share data and data variables. Thus, FIG. 9 illustrates cooperation between a first and second GenSAA expert system. Accordingly, FIG. 9 should not be considered limiting, since any number of GenSAA expert systems can cooperate and share data in a manner as will be described subsequently.

FIG. 9 illustrates a two-way connection between the first GenSAA expert system 160 and a TPOCC data server 158. The same TPOCC data server 158 also includes a two-way connection with a second GenSAA expert system 162. Additional two-way connection is established between the first GenSAA expert system 160 and a GenSAA data server 164. The same GenSAA data server 164 is then connected in a two-way fashion to the second GenSAA expert system 162. Accordingly, as shown in FIG. 9, both the first GenSAA expert system 160 and the second GenSAA expert system 162 are connected to both TPOCC data server 158 and GenSAA data server 164. Further, it should be noted that, for simplicity purposes, FIG. 9 illustrates two-way connections, referring to both two-way transfer of control information and two-way transfer of data.

Although GenSAA expert systems were designed and intended to be relatively simple with small rule bases, which could typically be developed by a single analyst, GenSAA expert systems can also handle more complex monitoring situations. A typical small system might monitor and isolate faults for one subsystem onboard a spacecraft. However, to monitor several spacecraft subsystems in an interconnected manner, multiple GenSAA expert systems such as those shown in FIG. 9 can be built.

In these complex monitoring situations utilizing multiple GenSAA expert systems, each system is responsible for a discrete subsystem or function. During operation, these expert systems execute concurrently and share key conclusions using a "publish and subscribe" method of communication.

The "publish and subscribe" method of information sharing involves GenSAA data server 164. The GenSAA data server 164 becomes a fourth component of the run-time framework 36. The GenSAA data server 164 is used as a central repository for storage of information.

The publish and subscribe method of information sharing involving the GenSAA data server includes a created GenSAA expert system having the capability to "publish" certain elements of information. By this it is meant that one or more Inferred or User-Defined data variables defined in the Data Manager 22 and hence considered part of the data interface of an expert system, is currently specified as being "public" and therefore available for use by other GenSAA Expert Systems.

To designate a User-Defined or Inferred data variable as "public", the desired variable of such GenSAA Type (User-Defined or Inferred) is selected; the "Details . . ." button is clicked to make the Data Details panel (see FIG. 12) appear; and the "Yes" radio button for the "Export to Server" option is clicked. It should be noted that only the creator of an expert system can designate whether or not any given User-Defined or Inferred data variable is "public" and hence publicly available to other GenSAA Expert Systems.

By such a designation, which can be achieved by making the variable public and thereby "publishing" the information, the variable can be stored in GenSAA data server 164. Then, other "subscribing" GenSAA expert systems can receive the information when published or when designated as being public or usable between several expert systems. A WorkBench user subscribes to this publicly available data by merely "selecting" it from the "EGG Data" list that is provided as a GenSAA Type on the Data Manager panel (FIG. 12). All EGG data is simply publicly-available Inferred and User-Defined data from other GenSAA Expert Systems. That is, this data is specified as "Export to Server" on the Data Details panel in the other respective GenSAA Expert Systems.

If a next created GenSAA expert system 162 transmits requests to GenSAA data server 164, then GenSAA data server 164 will permit access by the other GenSAA expert systems 162 to certain stored constructed variables (and updated values thereof) which have been previously designated as usable by other expert systems.

Specifically, the WorkBench user subscribes to publicly-available User-Defined or Inferred data variables of another GenSAA Expert System by selecting them from the Available External Data list for the GenSAA Data Type "EGG Data" on the Data Manager panel. If an Inferred data variable, for example, 'BatteryOperationStatus', is specified as public (i.e., the "Export to Server" option of this data variable is marked as "Yes"), then it is listed in the EGG Data List of the Data Manager 22 in the WorkBench for all other GenSAA Expert Systems. If the WorkBench user of one of these other Expert Systems is interested in receiving one of these EGG data variables, the user can select it from the Available External Data list and "Load" it into the Expert System Data list for the Expert System which they are developing. During runtime, this Expert System will subscribe to this variable and, if the source Expert System is executing also, it will receive all variable data updates from the GenSAA Data Server 164 as they are made.

The GenSAA data server 164 is a Unix process that can receive a real-time stream of "public" data designated as usable by other expert systems, which can be variables constructed by a data interface of an Expert System, User-Defined variables, or Inferred variables for many of a plurality of other GenSAA expert systems. The inferred variables, for example, can be new or Inferred data of variable updates, for example, output based upon certain rules in an expert system firing, to thereby provide data updates to other GenSAA expert systems.

The GenSAA data server 164 distributes "public" data designated as being usable by other expert systems to any GenSAA expert system that requests it provided that it is done in the proper subscription manner described above. Accordingly, "public" variables designated as being usable by other expert systems are transmitted from GenSAA data server 164 to subscribing expert systems connected thereto such as expert system "one" labeled as element 160 of FIG. 9 and expert system "N" labeled as element 162 of FIG. 9. As expert system, however, only receives those variables it requests or "subscribes to".

With regard to FIG. 9, a GenSAA expert system 160 initially requests certain telemetry or Mission data from TPOCC data server 158. This data is transmitted from the TPOCC data server 158 to the GenSAA expert system 160 as shown by element "A" of FIG. 9. Similarly, expert system N labeled as element 162 requests certain telemetry or Mission data from TPOCC data server 158, and this data is transmitted as shown by element "A" from TPOCC data server 158 to GenSAA expert system N, labeled element 162 of FIG. 9.

Thereafter, the first expert system 162 and/or the second expert system 162 can then designate certain information or variables as usable by other expert systems and can send this designated "public" constructed, User-Defined, or Inferred data variables or variable data updates to GenSAA data server 164 as labeled by element "X" in FIG. 9. The GenSAA data server 164 can then distribute data as shown by element "Z" in FIG. 9 to a subscribing GenSAA expert system 160 and/or GenSAA expert system 162. This data "Z" sent from GenSAA data server 164 is known as externally generated GenSAA (EGG data). A further description of this EGG data will follow.

A GenSAA expert system such as the expert system labeled as 160 or 162 in FIG. 9 receives EGG data shown by element "Z" in FIG. 9 via its data interface component in exactly the same way as it receives Mission data (labeled "A" in FIG. 9) from the TPOCC data server 158 for example.

EGG data is usable to satisfy conditions of a rule, similar to telemetry or other Mission data received. EGG data can be associated with display items or graphical display elements in the same way as Mission, User-Defined, and Inferred data. The GenSAA Workbench reports the selection of EGG data variables as a fourth variable type. The Workbench also allows any local User-Defined or Inferred data to be specified as "public" and thereby designatable as usable by other GenSAA expert systems, causing it to be sent to GenSAA data a server 164 as shown by element "X", and shared with other expert systems upon request. An EGG data variable can then be assigned a value, or reassigned a new or updated value, which is considered its data.

Figure 10:
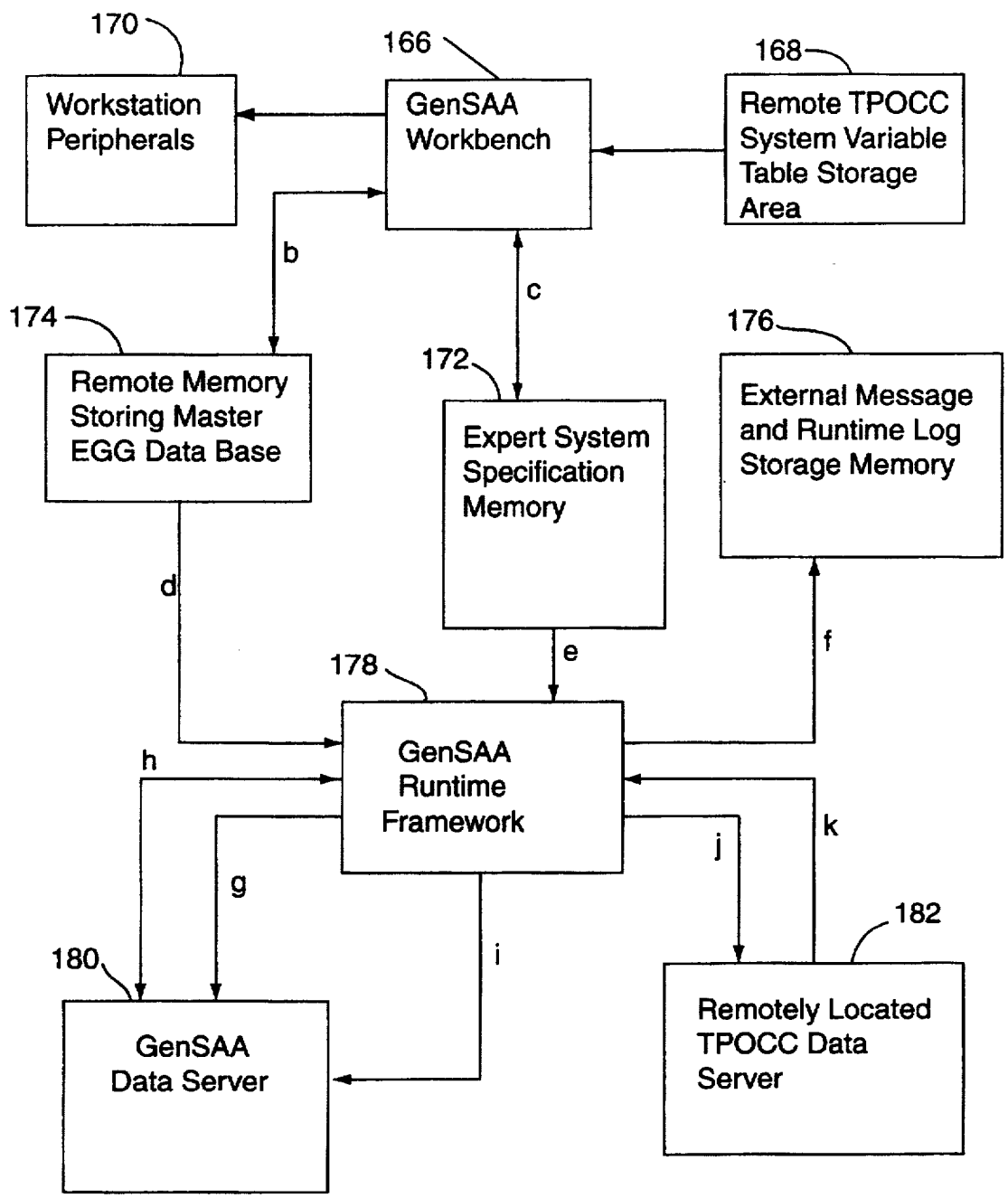
FIG. 10 illustrates a hardware embodiment of the system of the present application for creating, running, and continually updating expert systems.

FIG. 10 illustrates a summary of this system involving the GenSAA Workbench 166 and GenSAA run-time framework 178. It should be noted that single lines are shown connecting components for simplicity purposes. These lines represent both data and control lines which may be internal or external to a workstation 2. The system will be described as follows.

Initially, the GenSAA Workbench 166 reads definitions from a TPOCC system variable table stored in area 168 in a memory of a remote unit at the TPOCC control center 156. The variables provided to the GenSAA Workbench 166 help enable the generation of the data interface specification, rule base, the user interface specification for a GenSAA expert system. Once generated, this data interface specification, rule base, and user interface specification are transferred as shown by "c", to element 172 and stored therein.

Optionally, the GenSAA Workbench 166 can add data definitions to the master EGG database stored in the remote memory 174. These added definitions are shown by "b" in FIG. 10, passing from element 166 to element 174. These data definitions added are based upon the mission for which the expert system was established in element 166. It should further be noted that the GenSAA Workbench 166 is also connected to workstation peripherals 170 which enable the workbench to provide a verification report, user interface data, and rule based definition reports identifying inconsistencies and omissions in the expert system specification and other reports documenting details of the export system created.

It should be noted that the master EGG database is a file of all of the EGG data variables available for subscription by all GenSAA Expert Systems. It is stored on the hard disk (memory) of a machine and is accessible by all other WorkBench users.

In operation of the expert system created, the rule, data interface and user interface definitions are sent from expert system specification memory 172, as shown by "e" in FIG. 10, to the GenSAA run-time framework 178, which can be remotely located from the GenSAA Workbench 166 and its corresponding terminal or workstation 2. The GenSAA run-time framework 178 receives EGG data definitions "d" in FIG. 10, from the remote memory storing the master EGG database 174. The run-time framework 178 can request EGG data based upon subscription information received, "g" in FIG. 10, the request being made to the GenSAA data server 180. In return, the GenSAA data server 180 can then send EGG data requested (in the subscription mode previously described), "h" in FIG. 10, to the GenSAA run-time framework 178.

Further, the GenSAA run-time framework 178 can send inferred and User-Defined data variables marked as "public" to the GenSAA data server 180 for storage and subsequent forwarding to other expert systems upon request. This is shown by "i" in FIG. 10.

Further, during normal operation of the expert system, the GenSAA run-time framework 178 sends requests for Mission or other telemetry data as shown by "j" in FIG. 10, to a remotely located TPOCC data server 182. The TPOCC data server 182, in response to these requests based upon the particular Mission variables specified in the data interface specification of the expert system, forward the appropriate telemetry Mission data to the GenSAA run-time framework 178 as shown by "k" in FIG. 10. The data "k" received from the TPOCC data server 182 is received in real-time and any other data "h" received from GenSAA data server 170 is also received by the GenSAA run-time framework 178 in real time.

The expert system requests from the TPOCC data server 182 all Mission variables that are specified in the data interface specification. The data interface specification indicates how updated values for these variables are returned from the TPOCC data server 182 to the expert system in real time. Updated values can be returned "synchronously", meaning that whenever the TPOCC data server 182 receives an updated value of the Mission variable from the program that produces the value, the data server 182 sends it immediately to the expert system. Alternately, updated values can be returned "asynchronously", meaning that the data server 182 sends the current value of the Mission variable to the expert system at a regular interval specified in the data interface specification, for example every 5 seconds.

The GenSAA run-time framework 178 also drives the user interface display at the remote terminal or workstation 2 where the expert system was created and displays messages or modifies graphical display elements based upon the rule base and user interface specification of the expert system previously created. Finally, the GenSAA run-time framework 178 records important events and external messages in a run-time log file in a remotely located memory 176 as shown by "f" in FIG. 10.

The following information is stored for each message in the external message log 176: the day and time of day that the message was generated; the text of the message; and an indication of the criticality of the message.

A record of each rule in the rule base that is fired by the expert system, and each fact that is asserted or retracted by the expert system is also stored in the runtime log 176. Further, the following information is stored in the runtime log 176 for each rule that fires: the name of the rule; and the fact identifiers for the facts that caused the rule to fire. Finally, the following information is stored in the runtime log 176 for each fact that is asserted or retracted: the fact identifier for the fact; an indication of whether the fact was asserted or retracted; and the fact itself, that is, all the text fields of the fact.

As previously explained, the system and method for creating expert systems of the present application has been preferably described in the environment of analyzing spacecraft missions, to enable spacecraft analysts to rapidly build real-time graphical monitoring systems for use in TPOCC spacecraft control centers. However, it should be recognized that the system and method of the present application can be used to rapidly build real-time graphical and control expert systems for non-TPOCC control centers and for any other known purposes for which expert systems are used.

Other environments in which the present system and method can be used to build real-time graphical expert systems for a wide range of intelligent monitoring and control applications include, but are not limited to, industrial process control, network monitoring, and vehicle traffic monitoring and control. The system can be adapted for use in non-TPOCC control centers, and for other purposes, in a very straightforward manner as would be understood by those of ordinary skill in the art. The real time data generated by the environment being monitored, for example an industrial process, can be converted to the format required by the TPOCC data server by an external bridge program. One such bridge program has already been developed to adapt GenSAA to a non-TPOCC environment.

Using this approach, the real time data is received by the bridge program from the environment being monitored. The bridge program converts the data to the format required by the TPOCC data server, and sends the data to the TPOCC data server. The TPOCC data server then sends the data, as Mission variable updates, to the expert system as shown as "k" in FIG. 10. GenSAA can be adapted to many environments by using this approach.

Ideally, the system of the present application can be used for real-time monitoring of spacecraft data and can present a highly graphical user interface to depict the status of the spacecraft and ground support systems. The expert system created performs expert system inferences to draw conclusions about the status of the spacecraft and ground system and can be used to help visualize the status of spacecraft and ground systems to help ensure mission safety by supporting the launch, early orbit, and continuous operation phases of the spacecraft missions.

Such a GenSAA expert system can be easily developed by a user of the application, such as the spacecraft analyst or payload analyst who works in a missions operation center or payload operation center, utilizing various mouse based point-and-click and drag-and-drop direct manipulation operations not involving the writing of program code. Telemetry items to be monitored should be easily selectable from a list and graphics should be either draggable from a palette of predefined graphical objects or easily drawable utilizing known drawing tools.

The expert system rules can be automatically generated by simple interactive dialogue boxes rather than by the need for entering detailed programming in code. FIG. 14 illustrates the Condition Builder dialogue box and FIG. 15 illustrates the Action Builder dialogue box. These simple interactive dialogue boxes are used to create rules in a visual manner without requiring the user to enter detailed program code statements.

Rapid development of these expert systems is possible and the ability for easy last minute software changes is also possible. Edits can take place using the Rule Editor panel of FIG. 13. Also, a minimal amount of training is necessary for development since the systems are very user friendly. GenSAA enables users to create real time expert systems that have highly graphical user displays. GenSAA enables users to create these expert systems without writing detailed program code statements, as has been required with prior known systems. GenSAA enables users to create these expert systems using a visual programming approach, in which the data interface specification, the rule base, and the user interface specification are constructed using interactive dialogue boxes. An entire expert system can be created, including the data interface, rule base, and user interface, without writing any lines of program code or program code statements.

One exemplary aspect of an expert system generated is that of the Wind expert system. It was developed to support payload operations of NASA's Wind spacecraft and helps better visualize the status of several instruments on board the spacecraft. It was used to support monitoring the attitude of the Wind spacecraft in the Wind Project Operations Facility during launch and early orbit. It monitors spacecraft telemetry which includes data from the on-board Sun and Earth sensors and star scanners.

Figure 31:
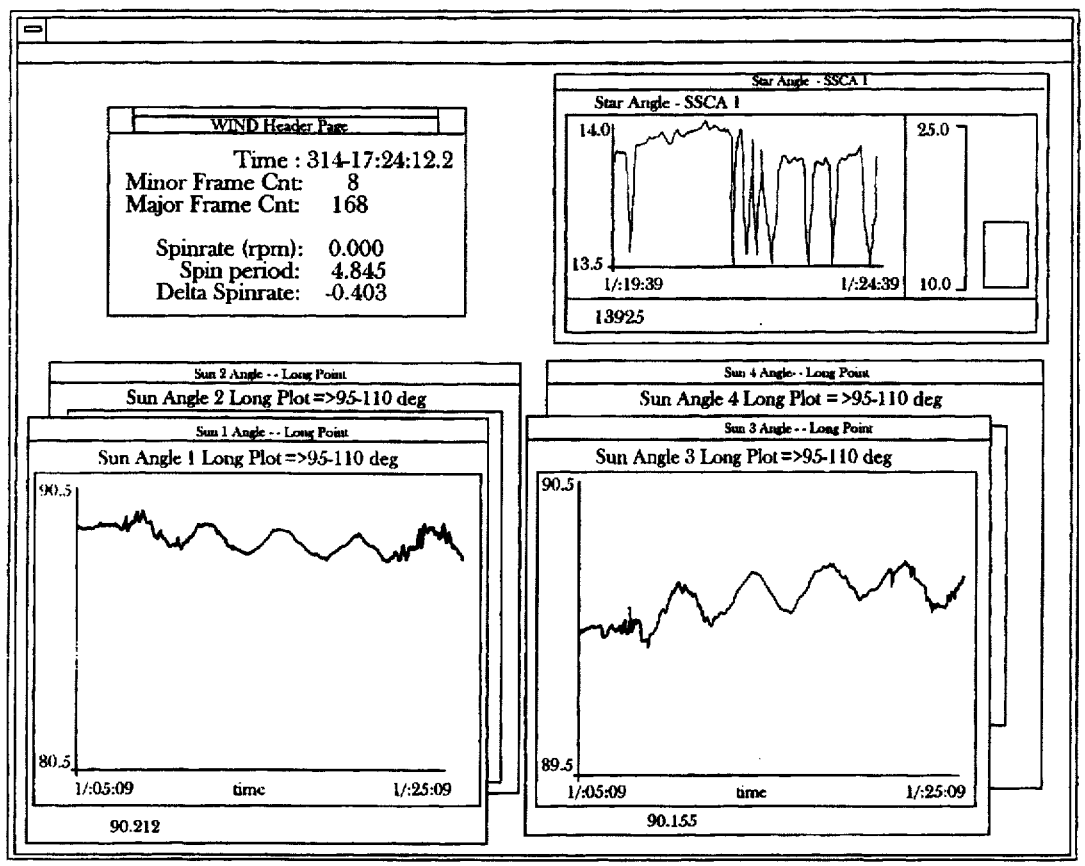
FIG. 31 illustrates an example GenSAA window (example #5).

FIG. 31 illustrates a display screen from the Wind Expert System. FIGS. 27, 28, 29, and 30 illustrate display screens from four other expert systems built using GenSAA.

The following is a summation of the process of creating an expert system using the GenSAA workbench and is provided in conjunction with FIGS. 11–25. The detailed description of such a process has already been provided herein before involving FIGS. 3–7, etc.

Building the Data Interface

Initially, the Data Manager panel (FIG. 11) is used to select the mission variables needed in the expert system. The user chooses "Mission" as the GenSAA Type in this panel. The workbench lists the mission variables available from the TPOCC data server in the Available External Data list. The user clicks on a mission variable name to highlight it, and then clicks the Load button to cause the mission variable to be added to the Expert System Data list. This is repeated for each mission variable desired.

The Data Manager panel (FIG. 11) is also used to specify the User-Defined variables needed in the expert system. The user chooses "User-Defined" as the GenSAA Type in this panel, and then clicks the New button. The Data Details panel (FIG. 12) appears, upon which the user enters the name of the new User-Defined variable, and other characteristics of the variable. This is repeated for each User-Defined variable desired.

The Data Manager panel (FIG. 11) and Data Details panel (FIG. 12) are also used to specify the inferred variables needed in the expert system. The user chooses "Inferred" as the GenSAA Type in this panel, clicks the New button, and uses the Data Details panel as described above regarding "User-Defined variables" to define the new inferred variable. This is repeated for each inferred variable desired.

Finally, the Data Manager panel (FIG. 11) is also used to select the externally-generated GenSAA (EGG) variables needed in the expert system. The user chooses "EGG" as the GenSAA Type in this panel. The workbench lists the EGG data variables available from the GenSAA data server in the Available External Data list. The user clicks on an EGG data variable name to highlight it, and then clicks the Load button to cause the EGG data variable to be added to the Expert System Data list. This is repeated for each EGG data variable desired.

Building Rules

The Rule Editor panel (FIG. 13) is used to create the rules in the rule base of the expert system. The names of the rules are listed in the Rule List box. To view a rule, the user clicks a rule name, and the workbench displays the "if" side of the rule in the Conditions box, and the "then" side of the rule in the Actions box. To add a new rule, the user clicks the New button, and enters the name of the new rule. The user then performs the steps described hereinafter regarding condition building and action building to form the conditions and actions of the rule. This is repeated for each rule defined in the expert system.

The Condition Builder panel (FIG. 14) is used to build the "if" side of the rule. The user drags the name of any variable from the Data Manager panel to the Name box in the Condition Builder panel, selects a mathematical operator from the Operator option menu, and enters a value by selecting an item from the Discrete option menu or by entering a number in the Analog box.

The Action Builder panel (FIG. 15) is used to build the "then" side of the rule. The user selects the type of action from the Action radio boxes. If the desired action is Assert, the user then drags the name of an inferred variable from the Data Manager panel to the Inferred Variable box in the Action Builder panel, and enters a value by selecting an item from the Discrete option menu or by entering a number in the Analog box. If the desired action is SendMessage, the user enters the text of the message in the Message box, and specifies the message destination and message severity from the option menus provided.

Building the User Interface

Figure 19:
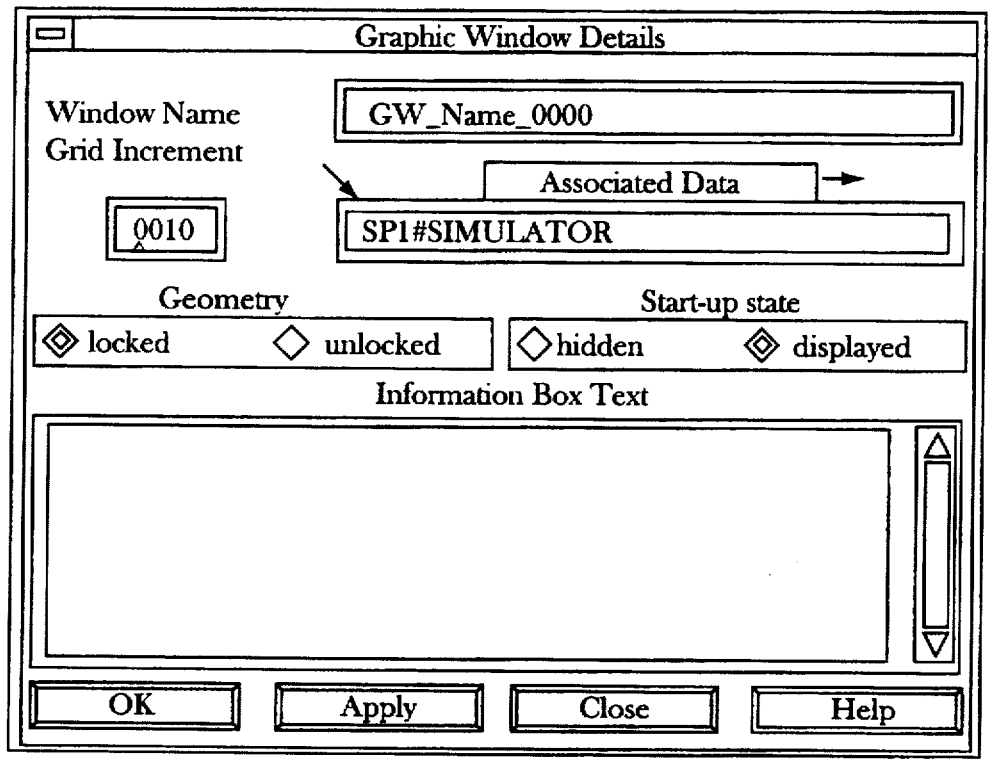
FIG. 19 illustrates the Graphic Window Details display screen window.

The User Interface Builder panel (FIG. 16) is used to build the user interface of the expert system. A new GenSAA Window (GW) is created by clicking the GW button, and then dragging the mouse pointer over the area to be occupied by the new GW. The detailed characteristics of the new GW are specified using the Graphic Window Details panel (FIG. 19). This is repeated for each GW desired.

The User Interface Builder panel (FIG. 16) is also used to create graphic display objects that are drawn on the GWs. The Text, Poly-lines, Rectangles, and Ellipse buttons are used to draw graphic objects of these types. This is repeated for each drawable graphical object desired on each GW.

More specifically, the UIGO palette (FIG. 22) is used to create instances of user-interface graphic objects (UIGOs). UIGOs are used by the expert system user to enter new values for User-Defined variables. The workbench user drags a UIGO from the palette onto a GW. A copy of the dragged UIGO is created on the GW. This is repeated for each UIGO desired on each GW.

The DDGO palette (FIG. 23) is used to create instances of data-driven graphic objects (DDGOs). DDGOs are used by the expert system user to display the current values of variables. The workbench user drags a DDGO from the palette onto a GW. A copy of the dragged DDGO is created on the GW. This is repeated for each DDGO desired on each GW.

Finally, the Image palette (FIG. 24) is used to create instances of image graphic objects (images). Images are used by the expert system to display the current values of variables. The workbench user drags an image from the palette onto a GW. A copy of the dragged image is created on the GW. This is repeated for each image desired on each GW.

The Graphic Object Details panel (FIG. 20) is used to associate a variable name with a graphical display object of any type (drawable, UIGO, DDGO, or image). The workbench user drags the name of any variable from the Data Manager panel to the Associated Data box in the Graphic Object Details panel, with the exception that only a user-defined variable name can be dragged to a UIGO. This is repeated for every graphical display object that is to be associated with a variable name.

The Geometry panel (FIG. 17) and Attributes panel (FIG. 18) are used to modify the display characteristics of a graphical display object. The Geometry panel is used to precisely modify the position and dimensions of an object. Position and dimensions can also be modified by selecting the object with the mouse, and dragging the object to a new location, or dragging on of its selection handles to change its size. The Attributes panel is used to change the colors of the object, and to change the font of text objects. This is repeated for every graphical display object that is to be modified.

The Graphic Object Behavior Rules panel (FIG. 21) is used to define the runtime animated behavior of a graphical display object. A behavior rule defines how the display characteristics of an object will change dynamically when the value of the object's associated data variable changes at runtime. Behavior rules can cause the colors, visibility, position, size, and other characteristics of the object to change. The user constructs one or more behavior rules using the controls in this panel. This is repeated for every graphical display object that is to have behavior rules.

Runtime Framework

When a GenSAA expert system is executed, the following steps are performed by the runtime framework whenever a new data value is received for a Mission, User-Defined, or EGG data variable:

A. The updated data value for the variable is sent to the interference engine component and the user interface component.

B. The inference engine component determines if the new data value for the variable causes the conditions of any rules in the rule base to be satisfied. All rules whose conditions are satisfied are placed on the rule agenda to be fired.

C. The inference engine selects the highest priority rule from the agenda and fires it, meaning that the inference engine performs all the actions on the right-hand side of the rule. Actions may include setting a new data value for an Inferred variable, sending a message to the user interface, or other actions. If an action sets a new data value for an Inferred variable, the new data value is sent to the user interface component. The new data value for the Inferred variable may cause the conditions for other rules to be satisfied; in this case, these other rules are also placed on the rule agenda to be fired. The inference engine continues to fire rules until none are left on the agenda.

D. The user interface component finds all the graphical display objects that have associated data variables that have received new data values. The following steps are performed for each such display object.

E. If the graphical display object is a DDGO such as a dial or bar graph, then the appearance of the DDGO is changed to reflect the new data value. For example, the position of the needle on the dial is adjusted, or the height of the bar in the bar graph is adjusted.

F. If the graphical display object has behavior rules, then the list of the behavior rules attached to the object are evaluated. For every behavior rule whose condition is satisfied, its action is performed. The actions of the behavior rules cause the display characteristics of the graphical display object to be dynamically modified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system for creating expert systems without the need for programming in code, comprising:

first means for creating a data interface by defining variables for input of appropriate data to drive an expert system using a direct manipulation style user-interface such that a user does not need to program in code;

second means for establishing conditions and actions to create rules of a rule base for the expert system using a direct manipulation style user-interface, the defined variables being usable to establish conditions which, when satisfied, produce corresponding established actions; and third means for creating by using a direct manipulation style user-interface a dynamic, user-customized graphical user interface for the expert system resulting in Graphic Windows each containing graphical display elements including real-time data-driven graphical objects, so that a highly graphical expert system is created without the need for programming in code.

2. The system of claim 1, wherein rules creatable by the second means include rules for inferring a data variable as an executed action of a rule, upon at least one corresponding condition being satisfied.

3. The system of claim 1, wherein the third means includes, selecting means for providing a plurality of prestored graphical display elements for selection and association with defined variables; and editing means for modifying a selected prestored graphical display element and for creating a graphical display element different from the prestored graphical display elements.

4. The system of claim 1 wherein said third means modifies the display characteristics of graphical display elements.

5. The system of claim 4 wherein said third means associates defined variables with said data-driven graphical objects by using a direct manipulation style user-interface.

6. The system of claim 5 wherein said third means defines behavior rules for the display characteristics of the data-driven graphical objects, said behavior rules specifying how real-time changes in the value of a variable will effect real-time changes in the display characteristics of the objects.

7. The method of claim 6, wherein said third means:

creates said graphical display elements by drawing said graphical display element using drawing tools provided by said direct manipulation style user-interface.

8. The method of claim 7, wherein said third means selects said graphical display elements from a set of prestored elements provided by said direct manipulation style user-interface.

9. A method of creating an expert system without the need of programming in code, comprising the steps of:

(a) selecting and defining variables for input of appropriate data necessary to drive the expert system to create a data interface by using a direct manipulation style user-interface such that a user does not need to program in code;

(b) establishing conditions and actions to create rules of a rule base for the expert system by using a direct manipulation style user-interface such that a user does not need to program in code, the defined variables of step (a) being usable to establish conditions which, when satisfied, produce corresponding established actions; and (c) creating by using a direct manipulation style user-interface a dynamic, user-customized graphical user interface for the expert system resulting in Graphic Windows each containing graphical display elements including real-time data-driven graphical objects so that a highly graphical expert system is created without the need for programming in code.

10. The method of claim 9, wherein the defining of step (a) includes selecting appropriate mission variables for input of appropriate spacecraft telemetry data and appropriate ground system control data from a plurality of predetermined mission variables.

11. The method of claim 10, wherein an expert system for monitoring functions of the spacecraft based upon real-time data values of selected appropriate mission variables defined in a real-time environment is creatable.

12. The method of claim 9, wherein step (c) includes the substeps of:
(c6) providing a plurality of prestored graphical display elements for selection and association with defined variables by using a direct manipulation style user-interface such that a user does not need to program in code; and
(c7) providing capabilities for modifying a selected prestored graphical display element and for creating a graphical display element different from the prestored graphical display elements by using a direct manipulation style user-interface such that a user does not need to program in code.

13. The method of claim 9, wherein step (a) further includes the substeps of,
(a1) defining variables based upon predetermined variables received from an external source; and
(a2) editing the received predetermined variables of step (a1) and using the edited variables in creating the data interface.

14. The method of claim 9, wherein step (b) further includes the substeps of,
(b1) establishing at least one condition of a rule using at least one defined variable, at least one selected mathematical operator, and at least one selected threshold value; and
(b2) establishing at least one action of a rule including output of at least one of a prestored message and a modification of a graphical display element.

15. The method of claim 9, further comprising the step of,
(d) utilizing at least one portion of a previously created data interface, rule base, or graphical user interface in creating the data interface of step (a), the rule base of step (b) or the graphical user interface of step (c), respectively by using a direct manipulation style user-interface such that a user does not need to program in code.

16. The method of claim 9, further comprising the steps of:
(d) storing the created data interface of step (a) in permanent memory;
(e) storing the created rule base of step (b) in permanent memory; and
(f) storing the created user interface of step (c) in permanent memory.

17. The method of claim 16 wherein an expert system is created which is capable of:
(g) requesting input data values from an external source based upon the defined variables of the stored data interface;
(h) distributing the input data values of step (g) for processing based upon the conditions of rules of the rule base stored in step (e);
(i) executing a corresponding action of a rule in the stored rule base when all conditions of the rule are satisfied based upon the distributed input data values; and
(j) outputting at least one corresponding inferred data variable through the user interface as an action of a rule being executed in step (i).

18. The method of claim 17, wherein step (j) includes displaying the output of at least one inferred data variable.

19. The method of claim 18, wherein said expert system is capable of,
(j) associating an inferred data variable with a graphical display element.

20. The method of claim 9, wherein said expert system is created which is capable of:
(d) requesting input data values from an external source based upon the defined variables of the data interface created in step (a);
(e) distributing the input data values of step (d) for processing based upon the conditions of rules of the rule base created in step (b);
(f) executing a corresponding action of a rule in the created rule base of step (b) when all conditions of the rule are satisfied based upon the distributed input data values; and
(g) modifying at least one corresponding graphical display element through the created user interface of step (c) as an action of a rule being executed in step (f).

21. The method of claim 20, wherein step (g) includes displaying the output at least one inferred data variable.

22. The method of claim 21, wherein said expert system is capable of,
(h) associating an inferred data variable with a graphical display element.

23. The method of claim 21, wherein the data interface of step (a) inputs appropriate data from one of the telemetry data from an external source being monitored, and inferred data.

24. The method of claim 23, wherein the values of the data requested in step (d) are displayed graphically through the user interface.

25. The method of claim 24, wherein the variables defined in step (a) and useable to establish rule conditions in step (b), are defined for input of one of telemetry data from an external source being monitored and inferred data.

26. The method of claim 25, wherein the defined variables can be edited by using a direct manipulation style user interface such that a user does not need to program in code.

27. The method of claim 9, wherein the defined variables can be edited by using a direct manipulation style user interface such that a user does not need to program in code.

28. The method of claim 9, wherein step (c) comprises the substep of:
(c1) modifying the display characteristics of graphical display elements.

29. The method of claim 28, wherein step (c) further comprises the substep of:
(c2) associating defined variables with said data-driven graphical objects by using a direct manipulation style user-interface.

30. The method of claim 29, wherein step (c) further comprises the substep of:
(c3) defining behavior rules for the display characteristics of the data-driven graphical objects, said behavior rules specifying how real-time changes in the value of a variable will effect real-time changes in the display characteristics of the objects.

31. The method of claim 30, wherein step (c) further comprises the substep of:
(c4) creating a said graphical display element by drawing said graphical display element using drawing tools provided by said direct manipulation style user-interface.

32. The method of claim 31, wherein step (c) further comprises the substep of, (c5) selecting a said graphical display element from a set of prestored elements provided by said direct manipulation style user-interface.

33. The method of claim 9, wherein step (a3) comprises the substep of:
(a31) modifying the display characteristics of graphical display elements.

34. The method of claim 33 wherein step (a3) further comprising the substep of:
(a32) associating defined variables with said data-driven graphical objects by using a direct manipulation style user-interface.

35. The method of claim 34, wherein step (a3) further comprises the substep of:
(a33) defining behavior rules for the display characteristics of the data-driven graphical objects, said behavior rules specifying how real-time changes in the value of a variable will effect real-time changes in the display characteristics of the objects.

36. The method of claim 35, wherein step (a3) further comprises the substep of:
(a34) creating a said graphical display element by drawing said graphical display element using drawing tools provided by said direct manipulation style user-interface.

37. The method of claim 36, wherein step (a3) further comprises the substep of,
(a35) selecting a said graphical display element from a set of a prestored elements provided by said direct manipulation style user-interface.

38. A method for creating a plurality of expert systems, without the need for programming in code, the method comprising the steps of:
(a) creating each of a plurality of expert systems by performing the substeps of,
(a1) selecting and defining variables for input of appropriate data necessary to drive the respective expert system to create a data interface by using a direct manipulation style user interface such that a user does not need to program in code
(a2) establishing conditions and actions to create rules of a rule base for the respective expert system by using a direct manipulation style user interface such that a user does not need to program in code, the defined variables of step (a1) being usable to establish rule conditions which, when satisfied, produce corresponding established actions, and
(a3) creating by using a direct manipulation style user-interface a dynamic, user-customized graphical user interface for the expert system resulting in Graphic Windows each containing graphical display elements including real-time, data-driven graphical objects so that a respective highly graphical expert system is created without the need for programming in code;
(b) designating at least one of the defined variables, of at least one expert system, as useable by other expert systems by using a direct manipulation style user interface such that a user does not need to program in code;
(c) storing at least one of the designated defined variables of step (b); and
(d) permitting access, by at least one other expert system, of at least one of the stored defined variables of step (c) for use in creating the data interface in the at least one other expert system.

39. The method of claim 38, wherein an expert system is creatable which is capable of:
(e) requesting, in at least one of the plurality of expert systems, input data values from an external source based upon the defined variables of the data interface created in step (a1);
(f) distributing the input data values of step (e) for processing based upon the conditions of rules of the rule base created in step (a2) for the at least one expert system;
(g) executing a corresponding action of a rule in the created rule base of step (a2) when all conditions of the rule are based upon the distributed input values of the at least one expert system; and
(h) outputting at least one corresponding inferred data variable through the created user interface of step (a3), as an action of a rule being executed in step (g) for the at least one expert system.

40. The method of claim 39, wherein step (h) includes displaying the output at least one inferred data variable.

41. The method of claim 40, further comprising the step of,
(i) associating an inferred data variable with a graphical display element by using a direct manipulation style user interface such that a user does not need to program in code.

42. The method of claim 39, wherein the data interface of step (a1) inputs appropriate data form one of telemetry data from an external source being monitored, and inferred data.

43. The method of claim 42, wherein the values of the data requested in step (e) are displayed graphically through the user interface.

44. The method of claim 43, wherein the variables defined in step (a1) and useable to establish rule conditions in step (a2), are defined for input of one of telemetry data from an external source being monitored and inferred data.

45. The method of claim 39, wherein the output at least one corresponding inferred data variable of step (h) are designatable in step (b) as usable for creating a data interface in step (a1).

46. The method of claim 45, further comprising the step of,
(i) defining at least one variable representing said inferred data.

47. The method of claim 46, wherein the defined at least one variable of step (i) is designatable in step (b) as usable for creating a data interface in step (a1).

48. The method of claim 34, wherein step (b) includes,
establishing an action of at least one rule to include a modification of a graphical display element upon input data of an associated defined variable satisfying a predetermined condition of the at least one rule.

49. The method of claim 48, wherein the graphical display elements include user-interface graphic objects modifiable based upon input data of associated user-defined variables, and data driven graphic objects for displaying current data values, based upon input data of an associated defined variable.

* * * * *